US011535208B2

(12) United States Patent
Matsuura et al.

(10) Patent No.: US 11,535,208 B2
(45) Date of Patent: Dec. 27, 2022

(54) HYDRAULIC TRANSAXLE

(71) Applicant: Kanzaki Kokyukoki Mfg. Co., Ltd., Amagasaki (JP)

(72) Inventors: Jun Matsuura, Amagasaki (JP); Koji Iwaki, Amagasaki (JP); Toshifumi Yasuda, Amagasaki (JP)

(73) Assignee: Kanzaki Kokyukoki Mfg. Co., Ltd., Amagasaki (JP)

( * ) Notice: Subject to any disclaimer, the term of this patent is extended or adjusted under 35 U.S.C. 154(b) by 968 days.

(21) Appl. No.: 16/292,052

(22) Filed: Mar. 4, 2019

(65) Prior Publication Data
US 2019/0270435 A1 Sep. 5, 2019

(30) Foreign Application Priority Data

Mar. 5, 2018 (JP) .............................. JP2018-39000
Mar. 13, 2018 (JP) .............................. JP2018-45978

(51) Int. Cl.
*B60T 1/00* (2006.01)
*B60T 13/22* (2006.01)
(Continued)

(52) U.S. Cl.
CPC .............. *B60T 1/005* (2013.01); *A01D 34/66* (2013.01); *B60K 17/105* (2013.01); *B60T 1/062* (2013.01);
(Continued)

(58) Field of Classification Search
CPC ....... B60K 17/105; F16H 39/10; F16H 39/12; F16H 47/02; F16H 2047/025;
(Continued)

(56) References Cited

U.S. PATENT DOCUMENTS 4,845,949 A * 7/1989 Shivvers ............. F16H 61/4157
60/489
6,874,320 B2 * 4/2005 Sakikawa ............ B60K 17/105
60/487
(Continued)

FOREIGN PATENT DOCUMENTS

EP 1586479 A2 10/2005
EP 1712399 A2 10/2006
(Continued)

OTHER PUBLICATIONS

Extended European Search Report issued in European Application No. 19160773.8, dated Jun. 7, 2019, 6 pages.

*Primary Examiner* — Richard M Lorence
(74) *Attorney, Agent, or Firm* — Sterne, Kessler, Goldstein & Fox P.L.L.C.

(57) ABSTRACT

A hydraulic transaxle facilitates mounting a parking brake unit which requires no link mechanism and is compact. The parking brake unit includes a brake rotor provided on a rotation shaft and a locking member being displaceable between a first position where the brake rotor is locked and a second position where the brake rotor is unlocked. The locking member includes a locking portion which is engaged in a recess formed in the brake rotor that locks the brake rotor in the first position, and a non-locking portion which is placed at a position corresponding to the recess and which separates from the brake rotor in the second position. The hydraulic transaxle further includes an oil-supply mechanism capable of displacing the locking member to the second position.

10 Claims, 20 Drawing Sheets

(51) Int. Cl.
  *F16D 63/00* (2006.01)
  *F16D 65/16* (2006.01)
  *F16H 39/10* (2006.01)
  *F16H 63/34* (2006.01)
  *A01D 34/66* (2006.01)
  *B60T 1/06* (2006.01)
  *F16H 7/00* (2006.01)
  *B60K 17/10* (2006.01)
  *A01D 69/03* (2006.01)
  *A01D 69/10* (2006.01)
  *F16D 121/04* (2012.01)
  *F16D 125/58* (2012.01)

(52) U.S. Cl.
  CPC ............ *B60T 13/22* (2013.01); *F16D 63/006* (2013.01); *F16D 65/16* (2013.01); *F16H 7/00* (2013.01); *F16H 39/10* (2013.01); *F16H 63/3441* (2013.01); *F16H 63/3483* (2013.01); *A01D 69/03* (2013.01); *A01D 69/10* (2013.01); *F16D 2121/04* (2013.01); *F16D 2125/585* (2013.01)

(58) Field of Classification Search
  CPC .. F16H 63/3441; F16H 63/3483; B60T 1/005; B60T 1/062; B60T 13/22; F16D 63/006; F16D 65/16; F16D 2121/04; F16D 2121/06; F16D 2125/585; F16D 2127/04; A01D 69/03; A01D 69/10

USPC .............................................. 192/219.4, 221
  See application file for complete search history.

(56) References Cited

U.S. PATENT DOCUMENTS

| | | | |
|---|---|---|---|
| 7,140,483 B2 * | 11/2006 | Kramer | F16H 63/3483 188/170 |
| 8,250,862 B1 | 8/2012 | Iida et al. | |
| 8,573,368 B2 | 11/2013 | Stover et al. | |
| 9,702,421 B2 | 7/2017 | Iwata et al. | |
| 9,771,989 B2 | 9/2017 | Iwata et al. | |
| 10,071,714 B2 | 9/2018 | Iwata et al. | |
| 10,648,560 B2 | 5/2020 | Kokubu et al. | |
| 2006/0260303 A1 | 11/2006 | Ishii et al. | |
| 2007/0151222 A1 | 7/2007 | Iida et al. | |
| 2016/0082933 A1 | 3/2016 | Iwata et al. | |
| 2016/0091037 A1 | 3/2016 | Iwata et al. | |
| 2016/0123412 A1 | 5/2016 | Iwata et al. | |
| 2016/0208916 A1 | 7/2016 | Kokubu et al. | |

FOREIGN PATENT DOCUMENTS

| | | |
|---|---|---|
| JP | WO2014203898 A1 | 12/2014 |
| WO | 2017057353 A1 | 4/2017 |

* cited by examiner

HYDRAULIC TRANSAXLE

BACKGROUND OF THE INVENTION

(1) Field of the Invention

At least one of embodiments of the present invention relates to a hydraulic transaxle having a parking brake unit.

(2) Description of Related Art

As disclosed in U.S. Pat. No. 8,573,368 for example, concerning a pair of left and right transaxles having brake units for restricting rotation of an axle and brake arms of the brake units, there is known transaxles having a parking brake device for simultaneously applying a brake or releasing the brake of the respective brake arms of the brake units. This specification discloses a pair of left and right hydraulic transaxles having a parking brake mechanism for restricting rotation of the axle when a vehicle is in park, and a hydraulic speed control mechanism for operating a hydraulic continuously variable transmission when the vehicle is running.

In such transaxles having the parking brake device, the transaxles include an electric actuator having a pair of displacement portions for driving the respective brake arms, and the displacement portions of the electric actuator and the pair of left and right brake arms are connected to each other through a pair of left and right brake rods. The brake arms and the rods are linked to each other through springs, thereby constituting an equalizer for reliably and equally operating both the left and right parking brakes. In the transaxles having the parking brake device of such configurations, a link mechanism for individually linking the pair of left and right brake rods to the electric actuator is necessary, and the parking brake device becomes large in scale.

In such hydraulic transaxles, it is necessary that an operator thereof separately operates the hydraulic speed control mechanism for operating the hydraulic continuously variable transmission and a hydraulic brake mechanism for operating the parking brake device. Hence, when the vehicle starts for example, it is necessary to first release the parking brake device and then, to operate the hydraulic continuously variable transmission to start running, and the driving operation of the vehicle becomes troublesome. It is easy to electrically link the hydraulic speed control mechanism and the hydraulic brake mechanism to each other. In this case, however, the number of accessory devices for linking increases and costs increase.

SUMMARY OF THE INVENTION

The present invention has been accomplished in view of the above-described problems, and the present invention provides a hydraulic transaxle facilitating mounting a parking brake unit which requires no link mechanism and is compact.

The problems to be solved by the present inventions are as described above. Means for solving the problems will be described next.

That is, a hydraulic transaxle of embodiments of the present invention includes: a housing which supports an axle and in which oil is stored; a hydraulic continuously variable transmission for driving the axle disposed in the housing that uses the oil as hydraulic oil; an oil-supply mechanism which draws the oil and which includes an external oil-supply circuit that transfers the oil from the housing to the exterior of the housing; a hydraulic speed control mechanism for adjusting output of the hydraulic continuously variable transmission; a parking brake unit configured to restrict rotation of the axle, comprising a brake rotor capable of rotating in association with the axle, and a locking member capable of displacing to a first position where the brake rotor is locked and cannot rotate and a second position where the brake rotor is unlocked and is free to rotate; and, the hydraulic transaxle further comprising a hydraulic brake mechanism capable of displacing the locking member from the first position to the second position by hydraulic pressure of the oil, wherein the hydraulic speed control mechanism and the hydraulic brake mechanism are connected to the hydraulic speed control mechanism and the hydraulic brake mechanism are connected to the external oil-supply circuit in parallel, an on-off valve configured to control supply of the oil from the external oil-supply circuit is provided at a location of the external oil-supply circuit closer to the oil-supply mechanism than a connecting point of the hydraulic speed control mechanism and the external oil-supply circuit, and a connecting point of the hydraulic brake mechanism and the external oil supply circuit.

Further embodiments include a work vehicle comprising a left transaxle according to the hydraulic transaxle described above disposed in the vehicle; a right transaxle according to the hydraulic transaxle described above disposed in the vehicle; the left and right transaxles further comprising oil output ports for taking the oil from the charge pumps to the exterior of the housings, wherein the oil output ports are disposed on the housings of the left transaxle and the right transaxle; and oil input ports which are in communication with replenishing systems of the oil to the hydraulic continuously variable transmissions disposed on outer surfaces of the left and right housings, wherein the oil-supply mechanisms of the left and right transaxles are charge pumps respectively provided in the hydraulic continuously variable transmissions of the left and right transaxles, wherein the left and right transaxles comprise a pair of oil passages for connecting the oil output port of any one of the housings and the oil input port of the other housing, and wherein any one of the pair of oil passages comprises the external oil-supply circuit.

In embodiments of the hydraulic transaxle of the present invention, the hydraulic brake mechanism further includes a spring member for biasing the locking member to the first position constantly.

Further, a hydraulic transaxle of embodiments of the present invention includes: a housing which supports an axle and in which oil is stored; a hydraulic continuously variable transmission for driving the axle disposed in the housing that uses the oil as hydraulic oil; and a parking brake unit for restricting rotation of the axle. The parking brake unit includes a brake rotor which is provided on a rotation shaft constituting the transmitting mechanism and which can coaxially rotate around the rotation shaft, and a locking member being displaceable between a first position where the brake rotor is locked and cannot rotate and a second position where the brake rotor is unlocked and is free to rotate. The locking member includes a locking portion which is engaged in a recess formed in the brake rotor and which locks the brake rotor in the first position, and a non-locking portion which is placed in a position corresponding to the recess and which separates from the brake rotor in the second position. The hydraulic transaxle includes an oil-supply mechanism capable of displacing the locking member to the second position by hydraulic pressure.

In embodiments of the hydraulic transaxle of the present invention, the parking brake unit further includes a pushing part capable of mechanically pushing the locking member from the first position, and the locking member can be displaced from the first position to the second position against a biasing force of the spring member by the pushing part.

In embodiments of the hydraulic transaxle of the present invention, a displacing direction of the locking member is parallel to a direction of the rotation shaft of the brake rotor, and the recess of the brake rotor is formed such that the locking member can be engaged in the recess along a direction which is parallel to the direction of the rotation shaft of the brake rotor.

Further embodiments include a work vehicle comprising a left transaxle according to the hydraulic transaxle described above disposed in the vehicle; a right transaxle according to the hydraulic transaxle described above disposed in the vehicle, the left and right transaxles further comprising oil output ports for taking supply systems of hydraulic oil from the charge pumps to the exterior of the housings; and oil input ports which are in communication with replenishing systems of the hydraulic oil to the hydraulic continuously variable transmissions disposed on outer surfaces of the left and right housings; wherein the oil-supply mechanisms of the left and right transaxles are charge pumps respectively provided in the hydraulic continuously variable transmissions of the left and right transaxles, wherein the left and right transaxles comprise a pair of oil passages for connecting the oil output port of any one of the housings and the oil input port of the other housing, and wherein the left and right transaxles further comprise valves configured to control supply of the hydraulic oil to the locking members of the left and right transaxles, and to control discharge of the hydraulic oil supplied from the locking members, wherein the valves are fluidly connected to one of the pair of oil passages.

In embodiments of the hydraulic transaxle of the present invention, the parking brake unit further includes a spring member for biasing the locking member to the first position constantly.

Further, in embodiments of the hydraulic transaxle of the present invention, a chamfered portion is provided around an outer peripheral edge of the recess of the brake rotor.

Further, in embodiments of the hydraulic transaxle of the present invention, a chamfered portion is provided around an outer peripheral edge of an end surface of the locking portion of the locking member on the side of the non-locking portion.

Embodiments of the present invention have at least the following effects.

According to the hydraulic transaxle of embodiments of the present invention, it is possible to make the parking brake unit compact without using a complicated link mechanism. According to this, it becomes easy to mount the parking brake unit in the transaxle.

According to the hydraulic transaxle of embodiments of the present invention, it is possible to bring the hydraulic speed control mechanism into its standby state in accordance with release of the parking brake unit, and it is possible to link the parking brake unit and the hydraulic speed control mechanism to each other by a simple mechanism. According to this configuration, since it is possible to reliably release the parking brake unit when the vehicle starts, it is possible to enhance the usability of a vehicle having the hydraulic continuously variable transmission.

BRIEF DESCRIPTION OF THE DRAWINGS

FIGS. 12A and 12B show operating conditions of the parking brake device operated by the control levers, wherein FIG. 12A is a partial sectional view, when viewed from rear, showing the control levers, and FIG. 12B is a partial schematic view, when viewed from top, showing the control levers;

FIGS. 18A, 18B, and 18C show operating conditions of the parking brake mechanism according to the second embodiment, wherein FIG. 18A shows when a parking brake is operating, FIG. 18B shows when the parking brake is not operating, and FIG. 18C shows when the operation of the parking brake is forcibly released;

FIGS. 20A, 20B, and 20C show a configuration for preventing the operation of the parking brake at a high speed, wherein FIG. 20A is an explanatory diagram of a configuration in which a brake rotor is provided with a chamfered portion, FIG. 20B is an explanatory diagram of a configuration in which a locking member is provided with a chamfered portion, and FIG. 20C is an explanatory diagram of a configuration in which a gap between a locking portion of the locking member and a recess of the brake rotor is made small.

DETAILED DESCRIPTION OF PREFERRED EMBODIMENTS

Hereinafter, embodiments of the present invention will be described.

First, an entire configuration of an embodiment of a vehicle having hydraulic transaxles according to the present invention will be described.

Figure 1:
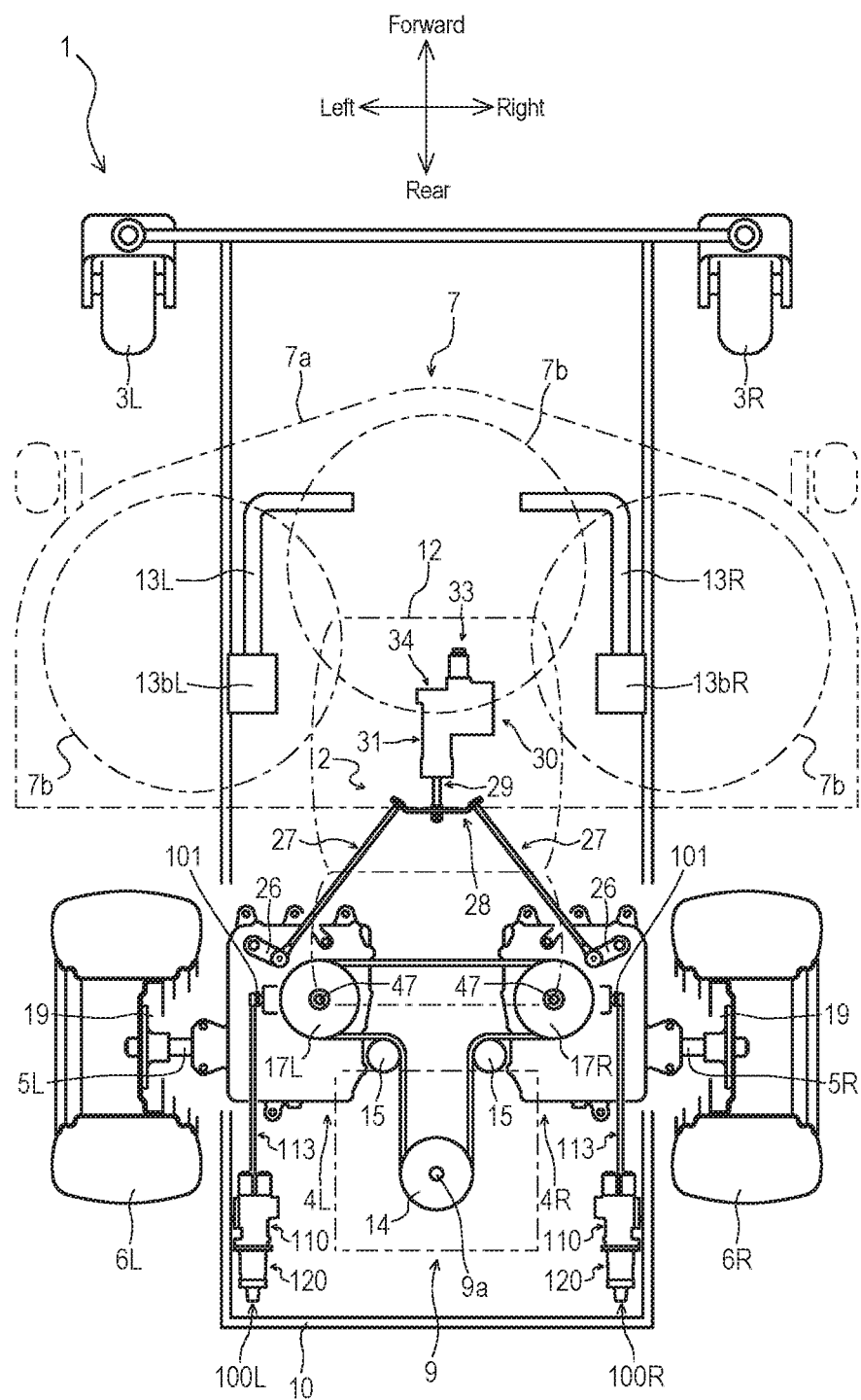
FIG. 1 is a plan view showing a working vehicle having transaxles according to a first embodiment of the present invention.
Figure 2:
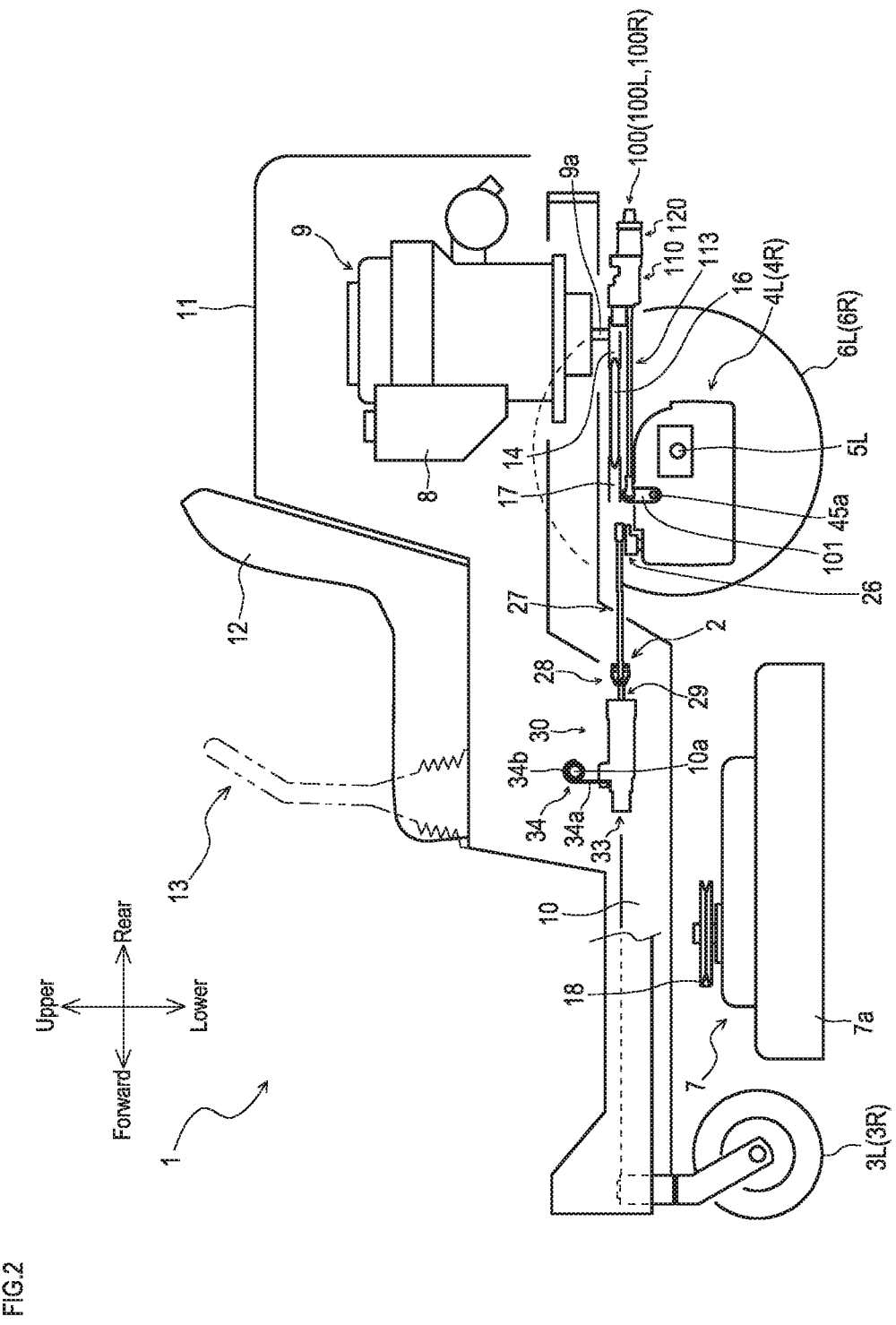
FIG. 2 is a partial sectional side view showing the working vehicle having the transaxles according to the first embodiment of the present invention.

A working vehicle 1 shown in FIGS. 1 and 2 is an embodiment of a vehicle having the hydraulic transaxles according to a first embodiment of the present invention. In the following description, a longitudinal direction, a vertical direction and a lateral direction of the working vehicle 1 are defined as shown in FIGS. 1 and 2, and the defined directions are also commonly adopted also in other descriptions.

Figure 5:
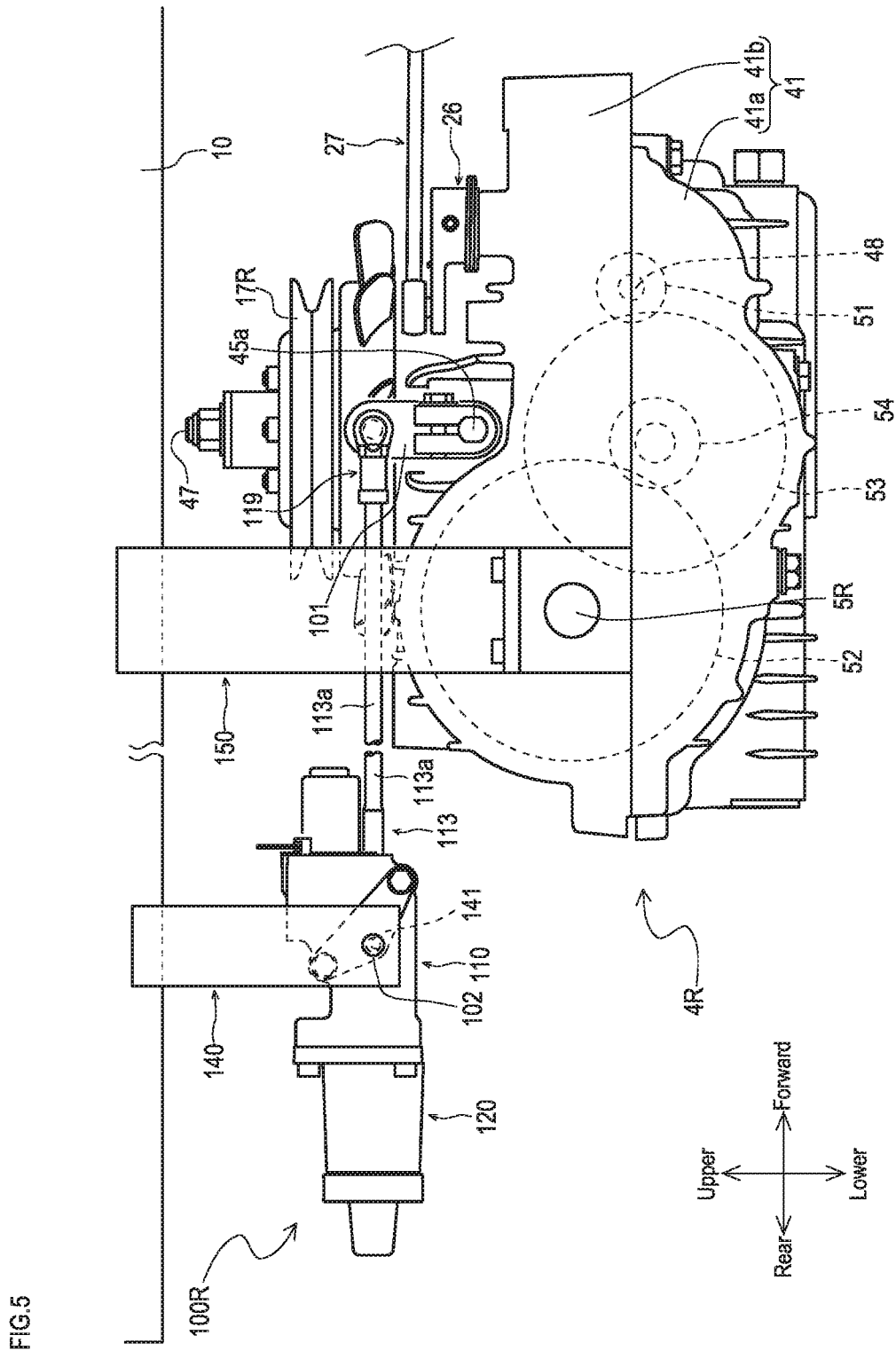
FIG. 5 is an enlarged side view of the right transaxle according to the first embodiment of the present invention.

A riding lawn mower is shown as one example of the working vehicle 1. The working vehicle 1 can turn in a state where its turning radius is effectively zero (zero turn). The working vehicle 1 has a longitudinally long vehicle frame 10 which extends in the longitudinal direction. A pair of left and right caster wheels 3L and 3R are placed on left and right sides of a front portion of the vehicle frame 10. A pair of left and right transaxles 4L and 4R are suspended from left and right sides of a rear portion of the vehicle frame 10 through a mounting stay 150 (see FIG. 5).

The transaxles 4L and 4R are hydraulic transaxles according to one of embodiments of the present invention. Axles 5L and 5R project outwardly from the respective transaxles 4L and 4R, and rear wheels 6L and 6R are fixed to outer ends of the axles 5L and 5R. A mower 7 is placed below the vehicle frame 10 between the rear wheels 6L and 6R and the caster wheels 3L and 3R. A prime mover 9 such as an internal combustion engine is placed on a rear portion of the vehicle frame 10, and a fuel tank 8 is provided in a front surface of the prime mover 9. The vehicle frame 10 and the prime mover 9 are covered with a cover 11. A driving seat 12 is placed on the cover 11, and a pair of left and right control levers 13L and 13R are placed on both left and right sides of the cover 11 at locations close to a front portion of the driving seat 12. A later-described parking brake device 2 is operated by simultaneously operating the control levers 13L and 13R from their neutral positions to parking positions.

A power output shaft 9a projects vertically downward from the prime mover 9, and an upper pulley 14 is fixed to the power output shaft 9a. The upper pulley 14 is connected to input pulleys 17L and 17R of the left and right transaxles 4L and 4R through a belt 16 which is stretched by a tension pulley 15. Power from the prime mover 9 is transmitted to the input pulleys 17L and 17R to drive the transaxles 4L and 4R. A lower pulley (not shown) is fixed to the power output shaft 9a, and the lower pulley is connected to an input pulley 18 of the mower 7 through a PTO clutch device (not shown) and a belt (not shown). The mower 7 is driven by power from the prime mover 9. A plurality of blades 7b are accommodated in a deck 7a of the mower 7, and it is possible to cut a lawn such as grass by rotating the blades 7b.

Figure 3:
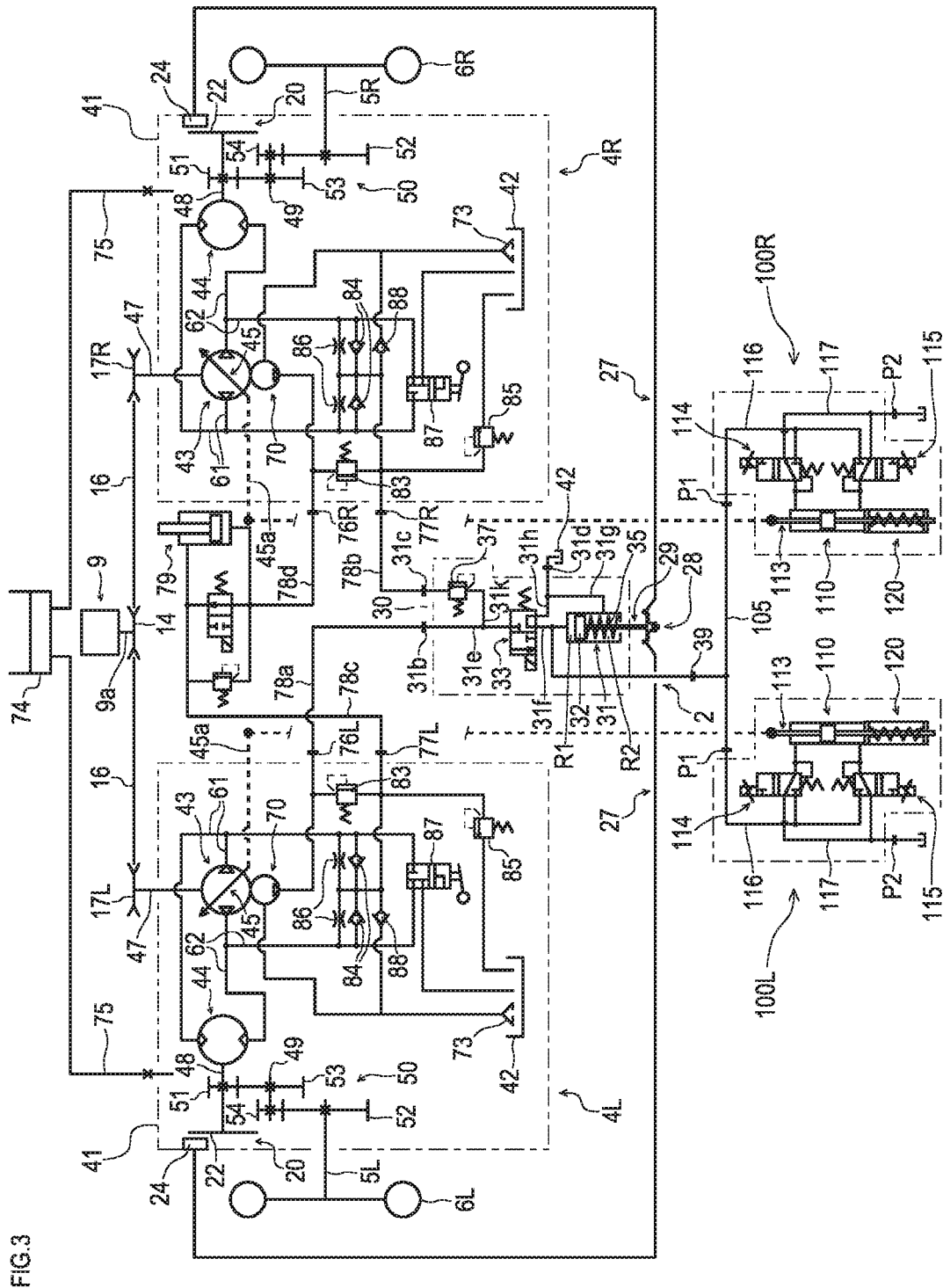
FIG. 3 is a hydraulic circuit diagram of the working vehicle having the transaxles according to the first embodiment of the present invention.
Figure 4:
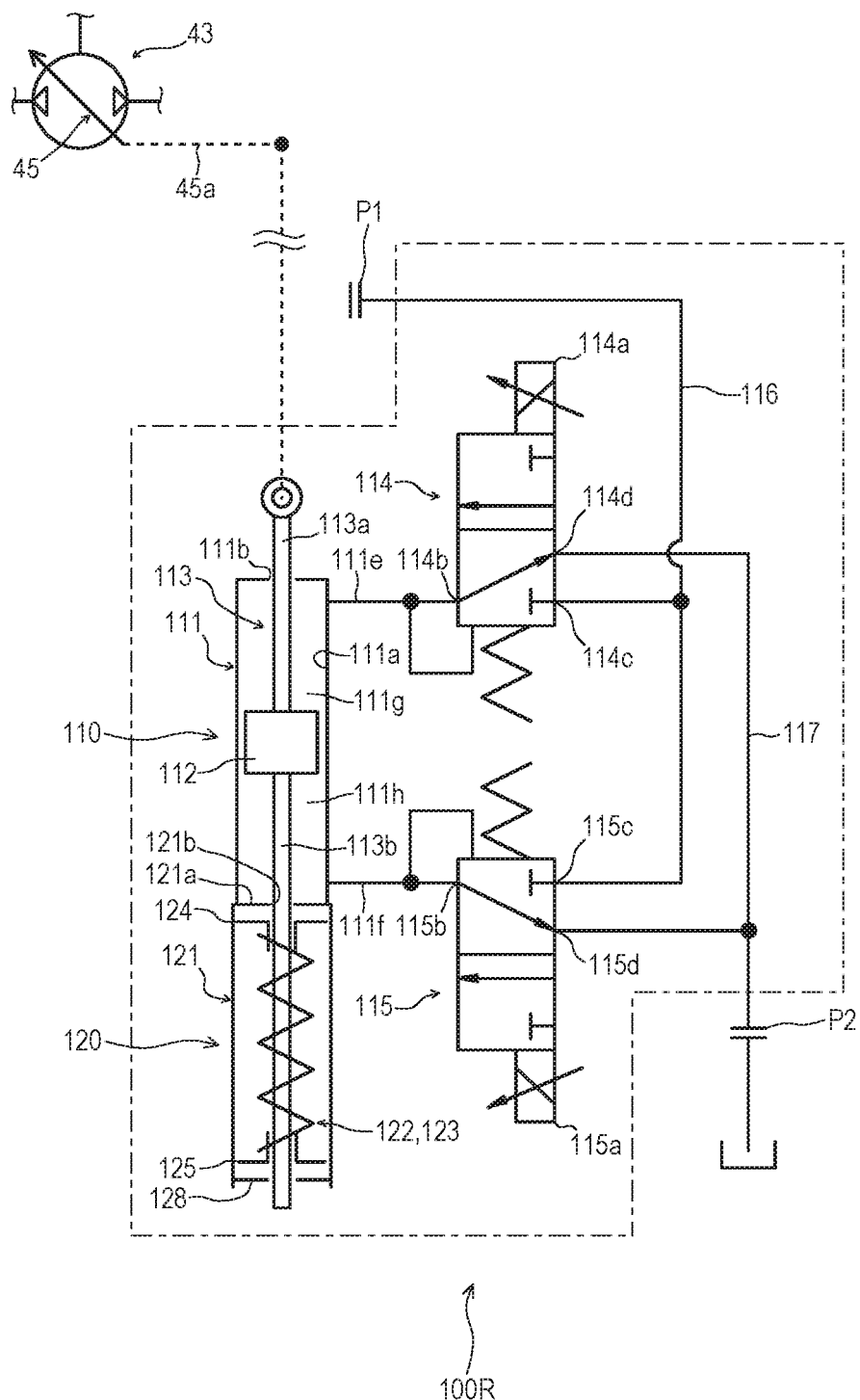
FIG. 4 is an enlarged schematic hydraulic circuit diagram of a right speed control set.

Next, the transaxles 4L and 4R will be described in more detail. As shown in FIGS. 1 to 3, the left and right transaxles 4L and 4R are laterally symmetric in structure. Therefore, the right transaxle 4R will mainly be described in the present embodiment, and only differences of the left transaxle 4L will be described.

Figure 9:
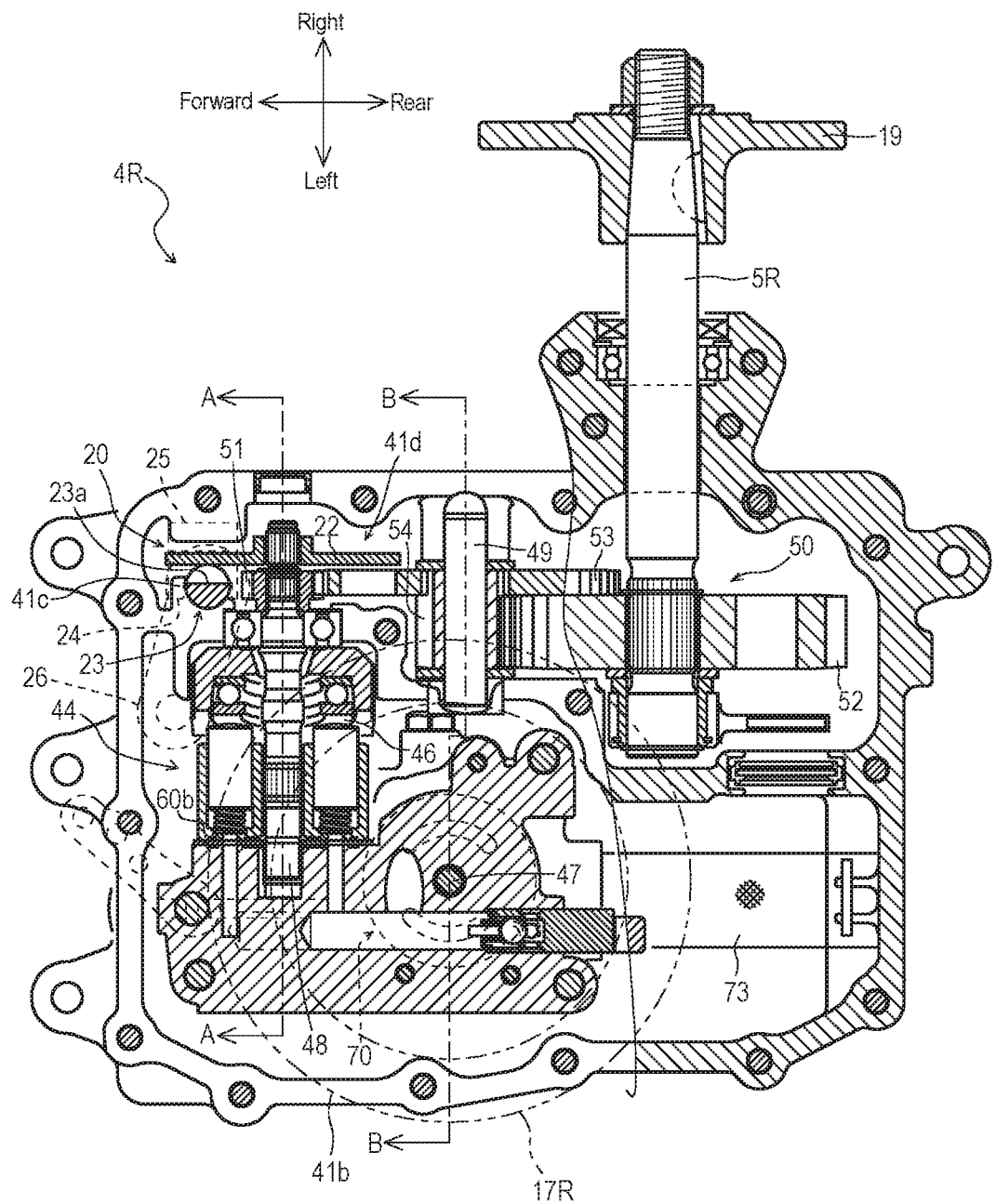
FIG. 9 is a sectional plan view showing the right transaxle.
Figure 10:
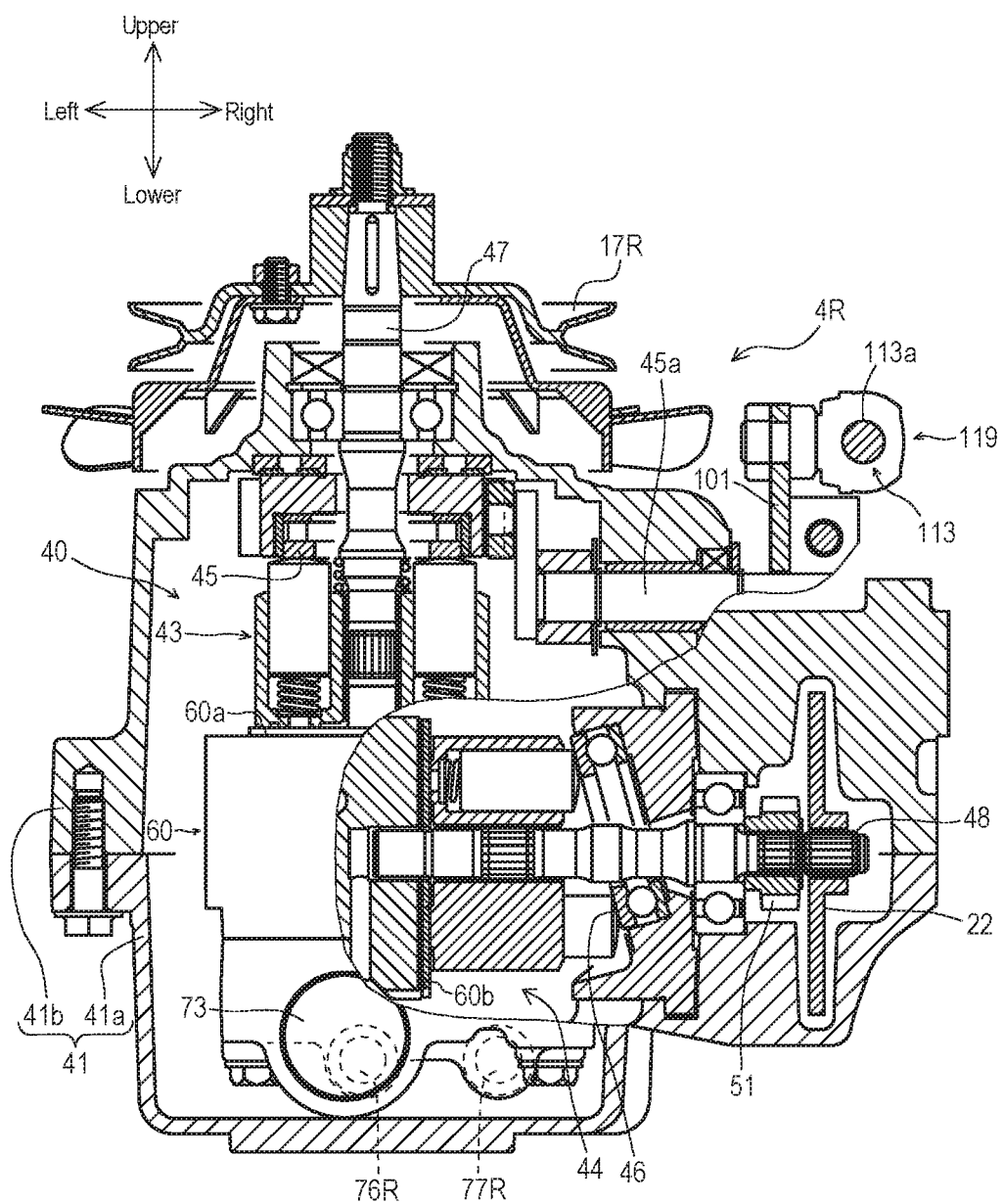
FIG. 10 is a partial sectional view taken along A-A line and B-B line in FIG. 9.

As shown in FIGS. 3, 9, and 10, the transaxle 4R has a housing 41 which is composed of an upper half housing 41a and a lower half housing 41b. A variable displacement and axial piston type hydraulic pump 43 and an axial piston type hydraulic motor 44 are disposed in the housing 41. The right axle 5R projects rightward from the housing 41, and a flange 19 which is connected to the rear wheel 6R is fixed to an outer end of the axle 5R. The pump and the motor may be of a radial piston type for example.

The hydraulic pump 43 and the hydraulic motor 44 are placed on a center section 60 which is provided in the housing 41. A hydraulic continuously variable transmission 40 is configured by mutually fluid-connecting the hydraulic pump 43 and the hydraulic motor 44 through a pair of oil passages 61 and 62 (closed circuits) provided in the center section 60. The hydraulic pump 43 includes a movable swash plate 45 as a volume-control device. A tilting angle and a tilting direction of the movable swash plate 45 are controlled, a discharging amount and a discharging direction of the hydraulic pump 43 are changed, and rotation speeds and rotation directions of the hydraulic motor 44 and the axle 5R are set. The hydraulic motor 44 includes a fixed swash plate 46. The hydraulic pump 43 includes a pump shaft 47 perpendicular to the axle 5R, and the input pulley 17R is fixed to an upper portion of the pump shaft 47.

When the mutually fluid-connected hydraulic pump 43 and hydraulic motor 44 are accommodated in the common housing 41, a horizontal upper surface of the center section 60 is defined as a pump-placing surface 60a, and the hydraulic pump 43 is placed on the pump-placing surface 60a. The pump shaft 47 of the hydraulic pump 43 is projected upward higher than an upper portion of the housing 41 toward a direction perpendicular to the axle 5R. Rotation power from the power output shaft 9a is transmitted to the pump shaft 47 through the input pulley 17R.

One perpendicular side surface of the center section 60 is defined as a motor-placing surface 60b, and the hydraulic motor 44 is placed on the motor-placing surface 60b. A motor shaft 48 and a counter shaft 49 of the hydraulic motor 44 are provided in the housing 41 in parallel to the axle 5R. A series of reduction gear train 50 is accommodated from the motor shaft 48 to the axle 5R. In the reduction gear train 50, a motor output gear 51 is fixed to the motor shaft 48, a bull gear 52 is fixed to the axle 5R, the counter shaft 49 is provided with a large-diameter gear 53, the large-diameter gear 53 is meshed with the motor output gear 51, the counter shaft 49 is provided with a small-diameter final pinion 54, the final pinion 54 is meshed with the bull gear 52, variable speed power from the hydraulic motor 44 is reduced and is transmitted to the axle 5R.

The pair of control levers 13L and 13R are connected to the movable swash plates 45 and 45 of the hydraulic pumps 43 and 43 in the transaxles 4L and 4R through later-described speed control sets 100 and 100. If the control levers 13L and 13R are tilted in the same direction through the same angle, volumes of the hydraulic pumps 43 and 43 are changed by the same amount, the left and right hydraulic motors 44 and 44 which receive the discharged oil output the same rotation numbers and therefore, a vehicle body of the working vehicle 1 straightly moves in the longitudinal direction. If the control levers 13L and 13R are tilted in the different direction through different angle, volumes of the hydraulic pumps 43 and 43 become different from each other on left and right sides, the left and right hydraulic motors 44 and 44 which receive the discharged oil output the different rotation numbers and therefore, the number of rotation of the left axle 5L and the number of rotation of the right axle 5R become different from each other and the vehicle body changes its moving direction to the lateral direction.

Embodiments of the parking brake device 2 provided in the working vehicle 1 will be described below.

As shown in FIGS. 1 to 3, the parking brake device 2 includes a parking brake mechanism 20, a brake arm 26, an auxiliary brake rod 27, an equalizer 28, a main brake rod 29, and a hydraulic actuator 30.

Figure 11:
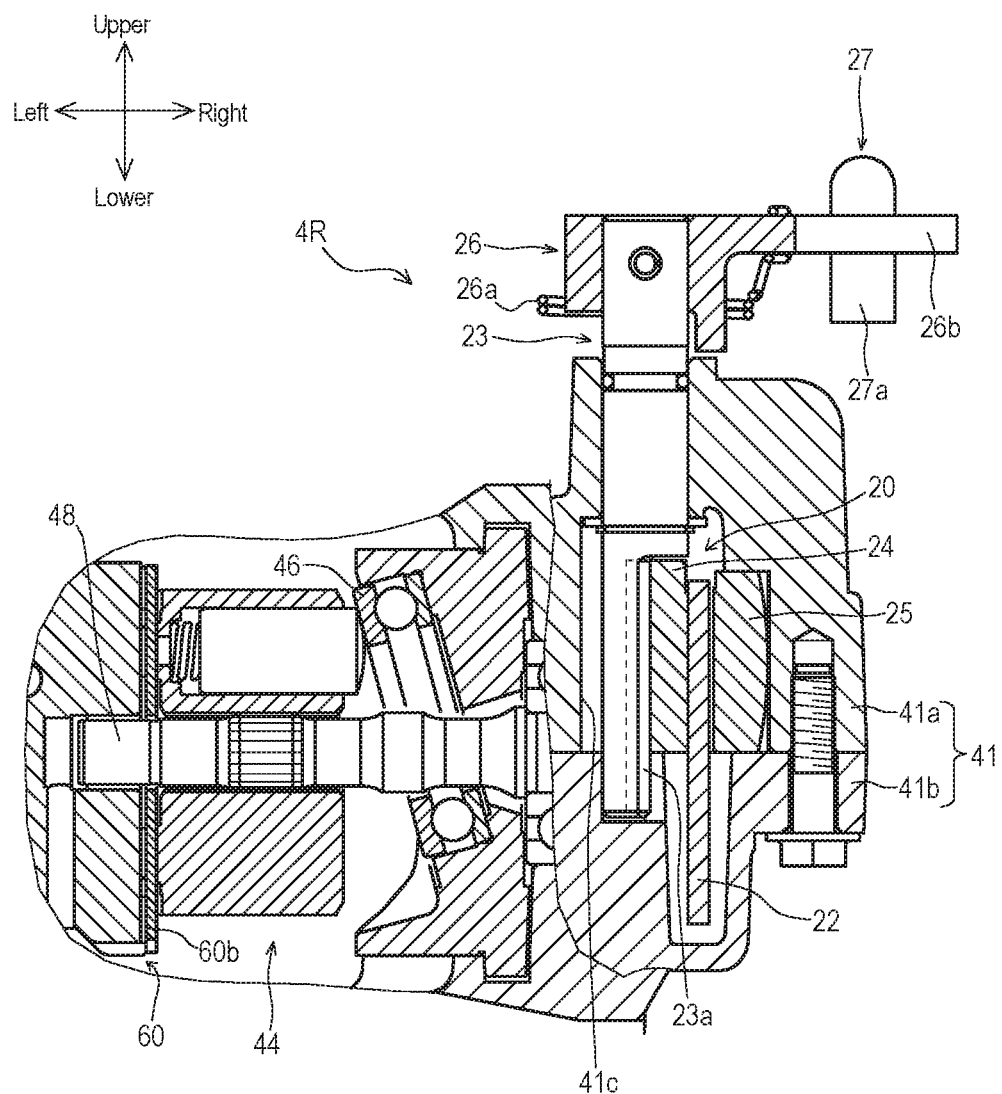
FIG. 11 is a partial enlarged sectional view, when viewed from rear, showing a parking brake mechanism in the right transaxle.

As shown in FIGS. 3, 9, and 11, in embodiments the parking brake mechanisms 20 are respectively provided in the housings 41 of the transaxles 4L and 4R. A brake rotor 22 is fixed to a portion of each of the parking brake mechanisms 20 which projects from the motor output gear 51 of the motor shaft 48. A vertical brake cam shaft 23 is placed between the brake rotor 22 and a left partition wall 41c thereof and supported by the upper half housing 41a such that a vertical midstream portion of the brake cam shaft 23 can turn. A lower portion of the brake cam shaft 23 is formed on a cam portion which is semicircular in cross section as viewed from above. When no brake is applied, a perpendicular flat surface 23a thereof is opposed to the brake rotor 22 in parallel by a biasing force of a return spring 26a.

A brake shoe 24 having a U-shape as viewed from above is placed between the perpendicular flat surface 23a of the brake cam shaft 23 and the brake rotor 22 such that the brake shoe 24 surrounds a cam portion of the brake cam shaft 23. A brake pad 25 is placed between the brake rotor 22 and an outer wall of the right upper half housing 41a. The brake cam shaft 23 projects upward higher than the upper half housing 41a, and the brake arm 26 is fixed to a projecting end of the brake cam shaft 23. The brake arm 26 can set a braking position and a non-braking position in its turning direction on an upper surface of the upper half housing 41a.

According to these embodiments of parking brake mechanism 20, if the brake arm 26 is set into the braking position, the perpendicular flat surface 23a of the brake cam shaft 23 is tilted with respected to the brake rotor 22 as viewed from above, one end of the perpendicular flat surface 23a pushes the brake shoe 24, the brake rotor 22 is sandwiched between the brake shoe 24 and the brake pad 25, and the motor shaft 48 is braked. If the brake arm 26 is set into the non-braking position, the perpendicular flat surface 23a of the brake cam shaft 23 becomes parallel to the brake shoe 24 and the brake rotor 22, the brake shoe 24 is separated from the brake rotor 22, and the motor shaft 48 can rotate.

As shown in FIGS. 1 and 2, one end of the auxiliary brake rod 27 is connected to a tip end of the brake arm 26. In the working vehicle 1, one ends of the pair of left and right auxiliary brake rods 27 and 27 are connected to the brake arms 26 and 26 of the pair of left and right transaxles 4L and 4R, and the other ends of the auxiliary brake rods 27 and 27 are connected to the common equalizer 28.

Figure 6:
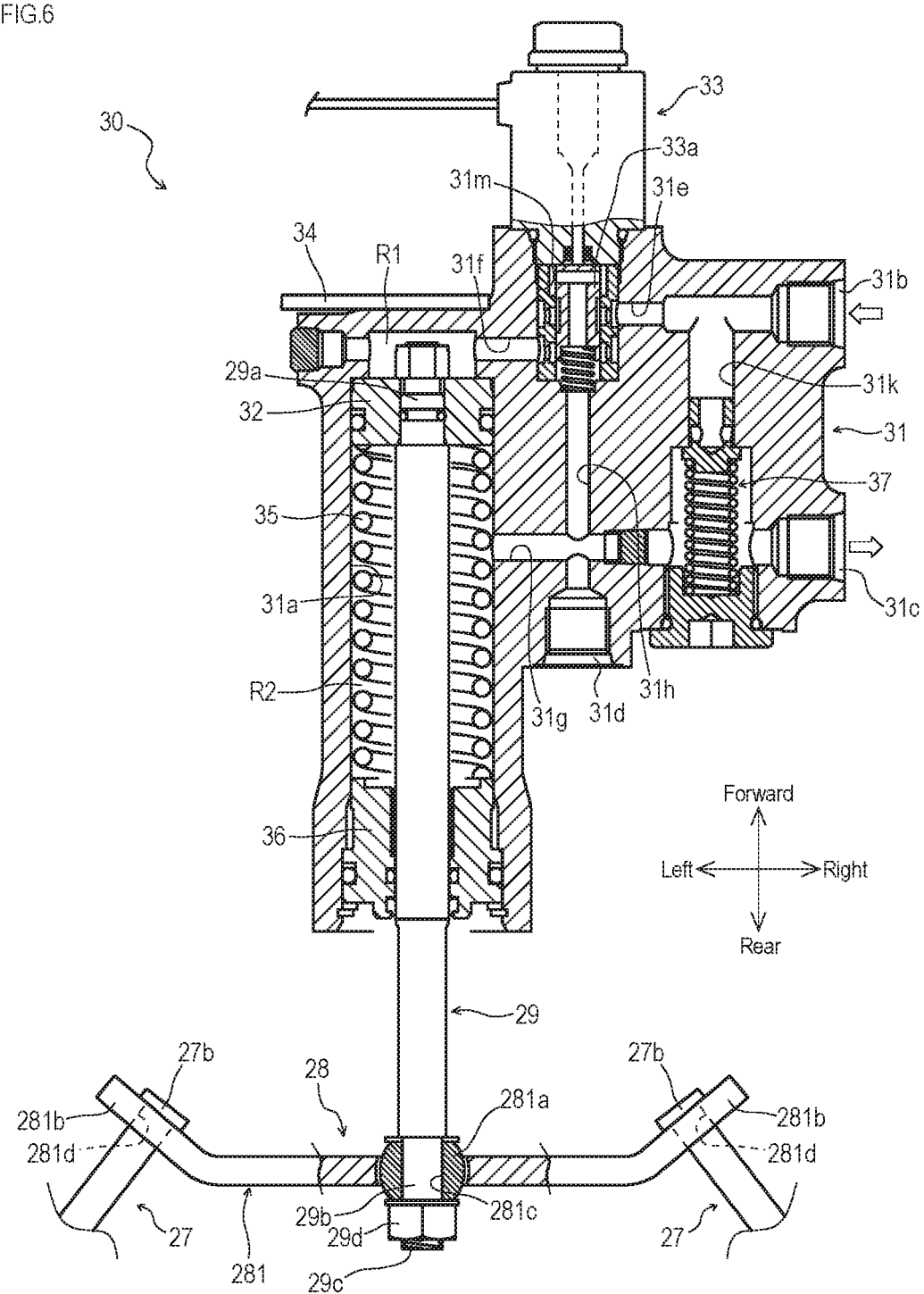
FIG. 6 is a sectional plan view of a hydraulic actuator according to the first embodiment.
Figure 7:
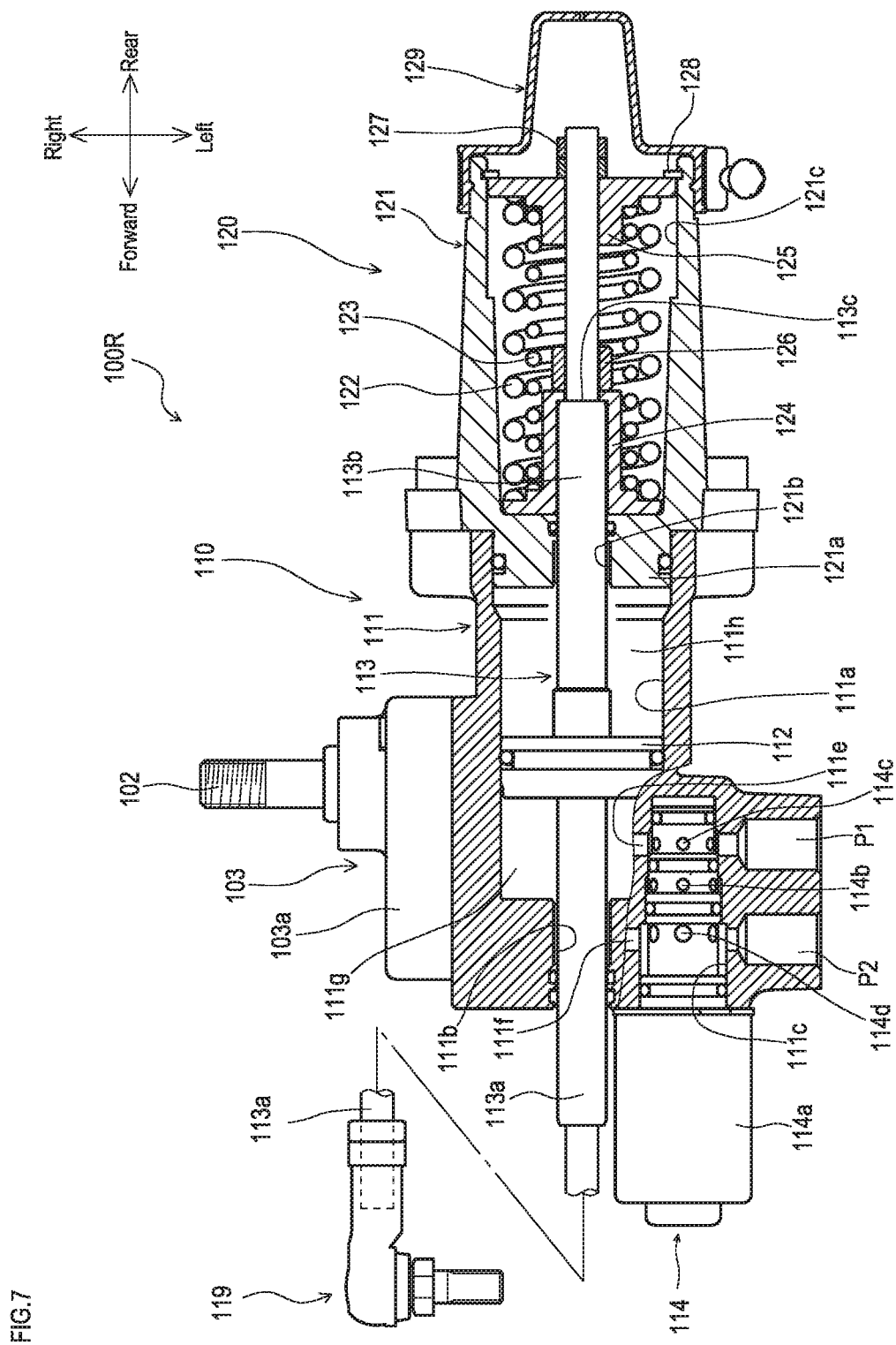
FIG. 7 is a partial sectional plan view (part 1) of the right speed control set.
Figure 8:
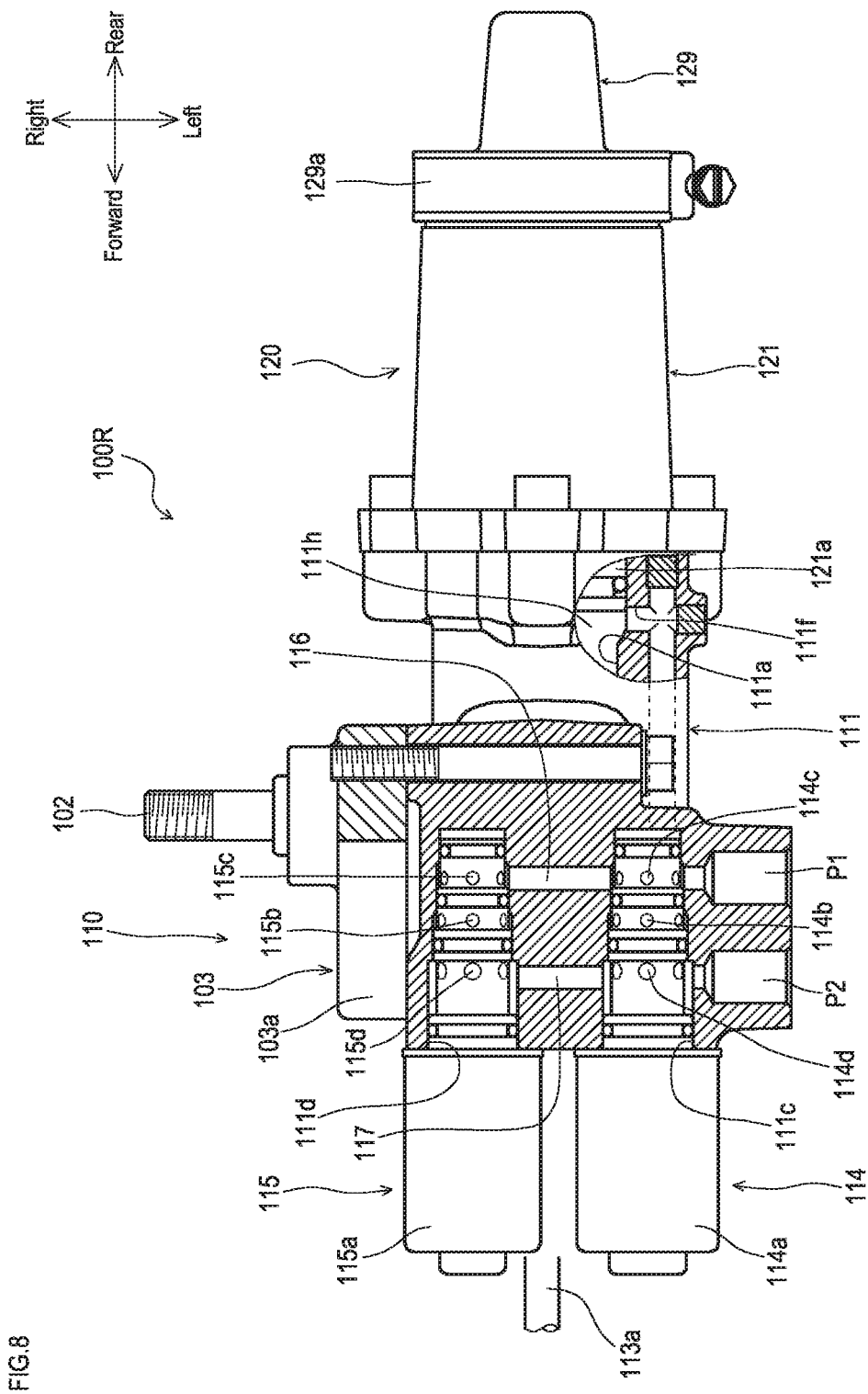
FIG. 8 is a partial sectional plan view (part 2) of the right speed control set.

As shown in FIG. 6, one end of the one main brake rod 29 is connected to the equalizer 28. The other end of the main brake rod 29 is connected to the single hydraulic actuator 30.

Embodiments of the equalizer 28 will be described below in detail.

As shown in FIG. 6, the equalizer 28 is for equally applying left and right brakes, and has the following configurations. A symbol 281 represents a balance arm. The balance arm 281 has rectangular flat-plate shaped both ends which are curved into substantially arc shapes. A longitudinally central portion of the balance arm 281 has a ball joint 281a. Bent portions 281b and 281b are formed on longitudinally both ends of the balance arm 281. A through hole 281c is formed at ball joint 281a to penetrate the balance arm 281 in its thickness direction. Through holes 281d are formed in central areas of the bent portions 281b to penetrate the same in the thickness direction. The through hole 281c is a hole into which the main brake rod 29 is inserted, and the through holes 281d are holes for fixing the auxiliary brake rods 27.

A rod-shaped locking portion 27a is formed on one end of each of the auxiliary brake rods 27. The locking portion 27a intersects with an axial direction of the auxiliary brake rod 27 at right angles. An enlarged-diameter portion 27b having a diameter larger than an inner diameter of the through hole 281d is formed on the other end of the auxiliary brake rod 27. The auxiliary brake rod 27 is inserted into the through hole 281d from the side of the locking portion 27a, the auxiliary brake rod 27 is further inserted to a position where the enlarged-diameter portion 27b abuts against the bent portion 281b and then, the locking portion 27a is locked to a hole portion 26b of the brake arm 26 and is placed there. According to this, the brake arms 26 and the equalizer 28 are connected to each other through the auxiliary brake rods 27.

A thread portion 29c is formed in the other end 29b of the main brake rod 29. The main brake rod 29 is inserted into a through hole 281c of the equalizer 28 from the side of the thread portion 29c, and a nut 29d is threadedly inserted into the thread portion 29c. The balance arm 281 is supported by the ball joint 281a such that the balance arm 281 can swing with respect to the main brake rod 29.

In the parking brake device 2, the main brake rod 29 is directly connected to a piston 32.

Here, a configuration of hydraulic circuits of the transaxles 4L and 4R in the parking brake device 2 will be described here.

As shown in FIGS. 3, 4, 9, and 10, a charge pump 70 which is a trochoid pump composed of an inner gear 71 and an outer gear 72 is placed on a lower surface of the center section 60. Oil is sucked from an oil reservoir 42 in the housing 41 through an oil filter 73, and an external reservoir tank 74 is externally mounted in the housing 41. In accordance with expansion and contraction of the volume of oil in the oil reservoir 42, oil is supplied and discharged into the oil reservoir 42 through a siphon 75.

The housings 41 of the left and right transaxles 4L and 4R are provided with outwardly opening ports 76L, 76R, 77L, and 77R. The ports 76L and 76R are connected to a discharge side of the charge pump 70, and the ports 77L and 77R are connected to a charge line of the hydraulic continuously variable transmission 40. That is, the port 76L is an oil output port 76L which outputs oil discharged from the charge pump 70 of the transaxle 4L to the outside, or the exterior, of housings 41, and the port 76R is an oil output port 76R which outputs oil discharged from the charge pump 70 of the transaxle 4R to the outside, or the exterior, of housings 41. Further, the port 77L is an oil input port 77L which inputs oil returning to the charge pump 70 of the transaxle 4L from outside, and the port 77R is an oil input port 77R which inputs oil returning to the charge pump 70 of the transaxle 4R from outside. The oil output port 76L is connected to the oil input port 77R and the oil output port 76R is connected to the oil input port 77L in a cross manner through a pair oil passages, i.e., a first oil passage composed of the oil passages 78a and 78b and a second oil passage composed of oil passages 78c and 78d. In this manner, one of the left and right transaxles 4L and 4R can supply charge oil to the other of the transaxles 4L and 4R by the charge pumps 70 and 70 provided in the transaxles 4L and 4R.

In the transaxles 4L and 4R, the hydraulic actuator 30 is placed on paths of the oil passages 78a and 78b which are the first oil passage. Pressure of hydraulic oil supplied to the hydraulic actuator 30 is adjusted by an implementation pressure adjusting valve 83 provided on the side of the transaxle 4L.

That is, in the transaxles 4L and 4R, one oil passages 78a and 78b of the pair of oil passages 78a and 78b and the pair of oil passages 78c and 78d are set as hydraulic circuits for supplying oil to outside of the housing 41. According to this configuration, it is possible to easily secure charge oil as a hydraulic power source for releasing the parking brake device 2 and as a hydraulic power source for operating the speed control set 100 while cooling the continuously variable transmission 40.

Here, the hydraulic actuator 30 will be described.

As shown in FIGS. 3 and 6, the hydraulic actuator 30 is a device which serves as a driving source of the parking brake device 2, and the hydraulic actuator 30 includes an actuator body 31, the piston 32, a solenoid valve 33, and a stay 34.

As shown in FIG. 2, the stay 34 includes a base portion 34a which extends in a vertical direction of the vehicle body of the working vehicle 1, and a semi-arc shaped locking portion 34b which is continuous with the base portion 34a and which becomes a projection projecting upward of the vehicle body. The hydraulic actuator 30 locks the locking portion 34b to a pin 10a which extends in a latera direction of the vehicle body provided on the vehicle frame 10, and is placed in such an attitude that the main brake rod 29 is directed in the longitudinal direction of the vehicle body.

As shown in FIGS. 3 and 6, in the hydraulic actuator 30, a cylinder 31a which is a substantially cylindrical gap is formed in the actuator body 31, and the piston 32 and a spring member 35 are provided in the cylinder 31a. The piston 32 is composed of a substantially cylindrical member, and the piston 32 can be displaced in a cylindrical axial direction of the cylinder 31a in the cylinder 31a. One end 29a of the main brake rod 29 which is an output portion of the hydraulic actuator 30 of the cylinder 31a is coaxially fixed to a cylindrical shaft of the piston 32. The other end 29b of the main brake rod 29 extends outward from of a rear end opening of the cylinder 31a. A gap between the cylinder 31a and the main brake rod 29 is sealed by a sealing member 36 which is inserted into the cylinder 31a from the rear end opening. In the hydraulic actuator 30, a first oil chamber R1 is formed by the cylinder 31a and an upper side end of the piston 32, and a second oil chamber R2 is formed by a lower side end of the piston 32, the cylinder 31a and the sealing member 36 in a state where the piston 32 is inserted into the cylinder 31a such that the piston 32 can be displaced.

An IN-port 31b, an OUT-port 31c, a drain port 31d, oil passages 31e, 31f, 31g, 31h, and 31k, and a mounting hole 31m are formed in the actuator body 31.

The IN-port 31b is a port for supplying hydraulic oil from the transaxle 4L. The IN-port 31b is connected to the port 76L of the left transaxle 4L through the oil passage 78a.

The OUT-port 31c is a port for returning hydraulic oil to the transaxle 4R. The OUT-port 31c is connected to the port 77R of the right transaxle 4R through the oil passage 78b.

The drain port 31d is a port for discharging hydraulic oil from the cylinder 31a. The drain port 31d is in communication with the oil reservoir 42 of the housing 41.

The oil passages 31e and 31f bring the IN-port 31b and the first oil chamber R1 into communication with each other, and the mounting hole 31m of the solenoid valve 33 is placed between the oil passage 31e and the oil passage 31f.

According to such a configuration, supply and stop of hydraulic oil from the oil passage 31e to the oil passage 31f can be switched by switching the solenoid valve 33.

The oil passage 31g brings the drain port 31d and the second oil chamber R2 into communication with each other, and the oil passage 31h brings the oil passage 31g and the mounting hole 31m into communication with each other. According to such a configuration, the first oil chamber R1 and the second oil chamber R2 can be brought into communication with each other by switching the solenoid valve 33 (at the time of non-excitation).

The oil passage 31k brings the OUT-port 31c and the oil passage 31e into communication with each other, and a relief valve 37 which sets brake-releasing pressure of the hydraulic actuator 30 is placed on the way to the oil passage 31k. According to such a configuration, if the solenoid valve 33 is not excited, pressure of the hydraulic oil becomes high in the oil passage 31e, and if the relief valve 37 is operated, the entire amount of hydraulic oil supplied to the IN-port 31b is returned to the OUT-port 31c.

The solenoid valve 33 is threadedly provided in the mounting hole 31m formed in the actuator body 31, and a valve body 33a is placed in the mounting hole 31m.

The hydraulic actuator 30 is provided with a port 39 for supplying hydraulic oil to the later-described speed control set 100. The port 39 branches off from the oil passage 31f located on a secondary side of the solenoid valve 33. Supply of hydraulic oil from the port 39 is turned ON and OFF in accordance with ON and OFF of the solenoid valve 33.

Operation of the hydraulic actuator 30 will be described below.

As shown in FIGS. 3 and 6, the hydraulic actuator 30 excites the solenoid valve 33 when the vehicle runs for example, supplies hydraulic oil supplied from the IN-port 31b to the first oil chamber R1 through the valve body 33a and the oil passages 31e and 31f, discharges hydraulic oil filled in the second oil chamber R2 from the drain port 31d through the oil passage 31g, places the piston 32 at a brake non-operating position, and expands the main brake rod 29.

The hydraulic actuator 30 does not excite the solenoid valve 33 at the time of parking, returns hydraulic oil supplied from the IN-port 31b to the OUT-port 31c through the valve body 33a, the oil passage 31k and the relief valve 37, discharges hydraulic oil filled in the first oil chamber R1 from the drain port 31d through the oil passages 31f and 31h, places the piston 32 at a brake operating position, and shortens the main brake rod 29.

At the time of parking, the piston 32 is biased by the spring member 35 which serves as a biasing member, pressure of hydraulic oil disappears and at the same time, the piston 32 is displaced to the brake operating position. In the parking brake device 2, by switching the solenoid valve 33 in this manner, the piston 32 is placed at the brake non-operating position at the time of running, and the piston 32 is placed at the brake operating position at the time of parking.

Next, the speed control sets 100 will be described.

The speed control sets 100 shown in FIGS. 1 and 2 are for controlling angles of swash plates of the movable swash plates 45. In the working vehicle 1, the pair of left and right speed control sets 100 are placed behind the transaxles 4L and 4R. The speed control sets 100 are connected to the arm members 101 pivotally connected to the trunnion shafts 45a extending from the movable swash plates 45. In the following description, the left speed control set 100 is called as a left speed control set 100L and the right speed control set 100 is called as a right speed control set 100R.

A structure of embodiments of the speed control set 100 will be described using FIGS. 3, 4, 7, and 8. Since the left and right speed control sets 100L and 100R are of symmetric structure, the right speed control set 100R will be described as the representative in this embodiment.

As shown in FIGS. 3, 4, 7, and 8, the right speed control set 100R includes a servo portion 110 and a neutral returning portion 120.

The servo portion 110 is composed of a cylinder body 111, a piston 112, a piston rod 113, and pressure proportional control valves 114 and 115.

The cylinder body 111 is a casing constituting a longitudinally intermediate portion of the speed control set 100. A cylinder 111a, a rod hole 111b, valve holes 111c and 111d, and oil passages 111e and 111f are formed in the cylinder body 111. The cylinder body 111 extends substantially in the longitudinal direction. A longitudinally intermediate portion of the cylinder body 111 is pivotally supported by a support plate 140 through the pivot shaft 102. The support plate 140 is mounted on the vehicle frame 10.

The cylinder 111a is a substantially cylindrical gap formed in the cylinder body 111 which slidably accommodates the piston 112. The cylinder 111a is divided into the front side oil chamber 111g and the rear side oil chamber 111h by the piston 112.

The piston 112 is slidably provided in the cylinder 111a. The piston rod 113 longitudinally extends on an axis of the piston 112. According to such a structure, when the piston 112 is displaced in the cylinder 111a in the longitudinal direction, the piston rod 113 is displaced in accordance with the former displacement.

A front half portion 113a of the piston rod 113 located ahead of the piston 112 extends to forward outside of the cylinder body 111 through the rod hole 111b, and a projecting length of the front half portion 113a to outside from the cylinder body 111 can be increased and decreased. A rear half portion 113b of the piston rod 113 located behind the piston 112 extends rearward toward the neutral returning portion 120, and a projecting length of the rear half portion 113b from the cylinder body 111 toward the neutral returning portion 120 can be increased and decreased.

A portion of the cylinder body 111 which closes a front end side opening of the cylinder 111a of the cylinder body 111 configures support base portions of the pressure proportional control valves 114 and 115. The pressure proportional control valves 114 and 115 are threadedly provided in the valve holes 111c and 111d formed in the support base portions.

The oil passage 111e is formed in a wall of the cylinder body 111 such that the cylinder 111a and the valve hole 111c are in communication with each other. The oil passage 111e is connected to a front end of the cylinder 111a. As a result, the oil passage 111e is in communication with the oil chamber 111g. The oil passage 111f is formed in a wall of the cylinder body 111 such that the cylinder 111a and the valve hole 111d are in communication with each other. The oil passage 111f is connected to a rear end of the cylinder 111a. As a result, the oil passage 111f is in communication with the oil chamber 111h.

The pressure proportional control valve 114 supplies and discharge oil to and from the oil chamber 111g formed in a front side of the piston 112 in the cylinder 111a. The pressure proportional control valve 115 supplies and discharge oil to and from the oil chamber 111h formed in a rear side of the piston 112 in the cylinder 111a. The pressure proportional control valves 114 and 115 are electromagnetic proportional control valves having proportional solenoids 114a and 115a.

The pressure proportional control valves 114 and 115 are electrically connected, through wires or couplers, to control devices (not shown) which control operations of the pressure proportional control valves 114 and 115.

The pressure proportional control valve 114 includes a supply/discharge port 114b which is in communication with the oil chamber 111g through the oil passage 111e. The pressure proportional control valve 115 includes a supply/discharge port 115b which is in communication with the oil chamber 111h through the oil passage 111f. One of the pressure proportional control valves 114 and 115 is made as a pressure proportional control valve which is excited for forward movement, and the other one is made as a pressure proportional control valve which is excited for rearward movement. From one of the supply/discharge ports 114b and 115b of excited one of the pressure proportional control valves 114 and 115, oil is supplied to the corresponding oil chamber 111g or 111h through the corresponding oil passage 111e or 111f.

The cylinder body 111 includes an inlet port P1 and an outlet port P2. The inlet port P1 is, through an oil passage 116, in communication with an oil supply port 114c of the pressure proportional control valve 114 and an oil supply port 115c of the pressure proportional control valve 115. The outlet port P2 is, through an oil passage 117, in communication with an oil discharge port 114d of the pressure proportional control valve 114 and an oil discharge port 115d of the pressure proportional control valve 115.

In the left and right cylinder bodies 111 and 111, the left and right inlet ports P1 and P1 are connected to the port 39 of the hydraulic actuator 30 through the oil passage 105, and are connected to the oil output port 76L through the solenoid valve 33 of the hydraulic actuator 30.

According to such a configuration, the pressure proportional control valve 114 moves a spool (not shown) by the proportional solenoid 114a, "opens" the oil supply port 114c, and "closes" the oil discharge port 114d, thereby making it possible to supply hydraulic oil supplied from the inlet port P1 to the oil chamber 111g via the oil passage 111e through the oil supply port 114c and the supply/discharge port 114b. Further, the pressure proportional control valve 114 moves the spool (not shown) by the proportional solenoid 114a, "closes" the oil supply port 114c, and "opens" the oil discharge port 114d, thereby making it possible to discharge hydraulic oil accumulated in the oil chamber 111g from the outlet port P2 via the supply/discharge port 114b and the oil supply port 114c through the oil passage 111e.

The pressure proportional control valve 115 moves a spool (not shown) by the proportional solenoid 115a, "opens" the oil supply port 115c, and "closes" the oil discharge port 115d, thereby making it possible to supply hydraulic oil supplied from the inlet port P1 to the oil chamber 111h via the oil passage 111f through the oil supply port 115c and the supply/discharge port 115b. Further, the pressure proportional control valve 115 moves the spool (not shown) by the proportional solenoid 115a, "closes" the oil supply port 115c, and "opens" the oil discharge port 115d, thereby making it possible to discharge hydraulic oil accumulated in the oil chamber 111h from the outlet port P2 via the supply/discharge port 115b and the oil supply port 115c through the oil passage 111f.

The servo portion 110 controls the operations of the pressure proportional control valves 114 and 115, thereby adjusting hydraulic oil pressure which is set by the relief valve 37, and adjusting supply/discharge pressure to the oil chambers 111g and 111h. The servo portion 110 longitudinally slides the piston 112 in the cylinder 111a by balance with respect to biasing forces of later-described neutral biasing springs 122 and 123, and adjusts a longitudinal position of the piston rod 113.

In the servo portion 110, a cap-shaped connecting member 119 is threadedly provided in a thread portion of a front end of the front half portion 113*a* of the piston rod 113.

The servo portion 110 is connected to the movable swash plate 45 by pivotally connecting the connecting member 119 of a front end of the piston rod 113 to the arm member 101 which is fixed to the trunnion shaft 45*a*.

The servo portion 110 is placed in a rear portion of the transaxle 4R in a rotatable state by inserting the pivot shaft 102 into a shaft hole 141 which is formed in the support plate 140 provided in the vehicle frame 10. The pivot shaft 102 projects from a plate member 103 fixed to the servo portion 110. The plate member 103 is a support member which is fixed to the servo portion 110 by bolts and nuts. The servo portion 110 is designed such that when the plate member 103 swings around the pivot shaft 102, the servo portion 110 can also swing.

The neutral returning portion 120 is composed of a cylinder body 121, neutral biasing springs 122 and 123, spring-stopping members 124 and 125, nuts 126 and 127, a retaining ring 128 and a cover 129.

A substantially cylindrical boss portion 121*a* which projects forward and a rod hole 121*b* which penetrates an axis of the boss portion 121*a* are formed in the cylinder body 121. The boss portion 121*a* is provided in a rear end of the cylinder body 111 of the servo portion 110 coaxially with the cylinder 111*a* by fitting the boss portion 121*a* into a rear end opening of the cylinder body 111. The boss portion 121*a* extends along a right outer surface of the vehicle frame 10.

A front end of the cylinder body 121 is sealed by the boss portion 121*a*, and a rear end thereof is opened. The rear half portion 113*b* of the piston rod 113 is inserted into the rod hole 121*b* in the longitudinal direction such that the rear half portion 113*b* penetrates the cylinder body 121. The rear half portion 113*b* of the piston rod 113 can extend rearward from a rear end of the cylinder body 121. The piston rod 113 can slide in the axial direction (longitudinal direction) of the rod hole 121*b*. When the piston rod 113 slides forward, a rear end of the rear half portion 113*b* of the piston rod 113 can project rearward from a rear end of the boss portion 121*a*.

In the cylinder body 121, the front and rear spring-stopping members 124 and 125 are slidably engaged into the rear half portion 113*b* of the piston rod 113 such that the spring-stopping members 124 and 125 can slide in the axial direction relative to the cylinder body 121. The two coil spring-shaped neutral biasing springs 122 and 123 having different spring diameters are interposed between the pair of spring-stopping members 124 and 125 in the cylinder body 121 such that the springs 122 and 123 surround the piston rod 113. The neutral biasing spring 123 having a smaller spring diameter is arranged coaxially with the piston rod 113 inside the neutral biasing spring 122 having a larger spring diameter. The retaining ring 128 is fixed to an inner periphery of a rear end of the cylinder body 121. A forward sliding movement of the front side spring-stopping member 124 is restricted by a rear end surface of the boss portion 121*a* of the cylinder body 121, and a rearward sliding movement of the rear side spring-stopping member 125 is restricted by the retaining ring 128. In the rear sliding movement of the piston 112, a rear portion of the cylinder body 121 is provided with the cover 129 to protect a rear portion of the piston rod 113 which projects rearward. The cover 129 is made of rubber having elasticity. The cover 129 is fixed to the cylinder body 121 by fastening a band 129*a* which is fitted over the cover 129.

In the neutral returning portion 120, the neutral biasing springs 122 and 123 are in initial compressed states, and both the front and rear spring-stopping members 124 and 125 are respectively pressed and contacted with a rear end surface of the boss portion 121*a* and the retaining ring 128 by longitudinally outward spring forces of the neutral biasing springs 122 and 123.

A step portion 113*c* is formed on an axially intermediate portion of the rear half portion 113*b* of the piston rod 113, and the step portion 113*c* abuts, from front, against the front spring-stopping member 124 in a state where the spring-stopping member 124 abuts against the rear end surface of the boss portion 121*a*. The nut 126 is threadedly provided over the rear half portion 113*b* of the piston rod 113, and the nut 126 abuts against the spring-stopping member 124 from a rear side. According to this, the step portion 113*c* and the nut 126 sandwich the front spring-stopping member 124, and the spring-stopping member 124 is fixed to the piston rod 113. Further, the nut 127 is threadedly provided over the rear half portion 113*b* of the piston rod 113, and the nut 127 abuts against the rear spring-stopping member 125 from the rear side. According to this, a rear sliding position of the rear spring-stopping member 125 is restricted by the nut 127. The nut 127 is a double nut.

A position of the piston rod 113 in its sliding direction where the neutral biasing springs 122 and 123 are in the initial states is defined as a neutral position of the piston rod 113. A connection structure between the movable swash plate 45 and the piston rod 113 is set such that the movable swash plate 45 comes to a neutral position when the piston rod 113 is in the former neutral position. A position of the piston 112 which appears by a state of oil in the oil chambers 111*g* and 111*h* in the cylinder 111*a* when both the proportional solenoids 114*a* and 115*a* of the pressure proportional control valves 114 and 115 are demagnetized is defined as a neutral position of the piston 112. The piston 112 is set such that it is placed in this neutral position when the piston rod 113 is in the neutral position.

When the piston 112 to which the piston rod 113 is added slides forward from the neutral position, the trunnion shaft 45*a* turns in one of the forward and rearward turning directions through the front half portion 113*a* of the piston rod 113, a thread portion 118, the connecting member 119 and the arm member 101. At that time, the cylinder body 111 of the servo portion 110 swings around the pivot shaft 102 to absorb a difference between a circumferential movement of the arm member 101 which is a turning member and a straight movement of the piston rod 113 which is a retreat member.

While the piston rod 113 is sliding rearward, the rear spring-stopping member 125 remains abutted against the rear retaining ring 128, and the front spring-stopping member 124 is pushed and moved rearward by the step portion 113*c* of the piston rod 113. According to this, the neutral biasing springs 122 and 123 are further compressed from the initial compressed states, a forward biasing force is given to the piston rod 113, and this biasing force becomes a forward biasing force which returns the piston rod 113 (eventually, piston 112 and movable swash plate 45) to the neutral position.

If the piston 112 to which the piston rod 113 is added slides rearward from its neutral position, the trunnion shaft 45*a* turns in one of the forward and rearward turning directions through the front half portion 113*a* of the piston rod 113, a thread portion 118, the connecting member 119 and the arm member 101. At that time, the cylinder body 111 of the servo portion 110 swings around the pivot shaft 102 in the same manner described above to absorb a difference between a turning movement of the arm member 101 and a straight movement of the piston rod 113.

While the piston rod 113 is sliding forward, the front spring-stopping member 124 remains abutted against the rear end surface of the boss portion 121a, and the rear spring-stopping member 125 is pushed and moved forward by the nut 127 provided on the rear end of the piston rod 113. According to this, the neutral biasing springs 122 and 123 are further compressed from the initial compressed states, and a rearward biasing force for returning the piston rod 113 (eventually, piston 112 and movable swash plate 45) to the neutral position is given to the piston rod 113.

As described above, the neutral position of the piston rod 113 defines the neutral position of the piston 112 (state where both proportional solenoids 114a and 115a of pressure proportional control valves 114 and 115 are demagnetized), and defines the neutral position of the movable swash plate 45 through the arm member 101. That is, if the piston rod 113 is returned to the neutral position by the biasing forces of the neutral biasing springs 122 and 123 by means of the neutral returning portion 120, the piston 112 of the servo portion 110 also returns to its neutral position. According to this, the rear end and the front end of the entire speed control set 100 (i.e., servo portion 110 and neutral returning portion 120) can swing up and down around the pivot shaft 102.

The neutral position of the piston 112 substantially coincides with a longitudinal position of the pivot shaft 102 in the longitudinal direction. According to this, operational balance of the piston 112 in the cylinder 111a is maintained excellently, and a swinging amount of the cylinder body 111 caused by retreat of the piston rod 113 is also suppressed.

In the speed control set 100, the cylinder body 111 constituting the servo portion 110 is mounted such that the cylinder body 111 comes to a position where an axis of the piston rod 113 and an axis of the pivot shaft 102 are superposed on each other as viewed from above with respect to the plate member 103. According to such a configuration, it is possible to swing the speed control set 100 more smoothly.

Operations of embodiments of the parking brake device 2 and the speed control set 100 will be described below.

According to the parking brake device 2 in the brake non-operating state, if a driver carries out the operation for simultaneously bringing the control levers 13L and 13R to parking positions (i.e., if artificially carries out parking command), the solenoid valve 33 of the hydraulic actuator 30 is brought into the non-excitation state, and the piston 32 (main brake rod 29) is displaced to the front brake operating position.

According to the parking brake device 2 in the brake operating state, if the driver carries out the operation for simultaneously bringing the control levers 13L and 13R out from the parking positions (i.e., if artificially releases parking command), the solenoid valve 33 of the hydraulic actuator 30 is excited, and the piston 32 (main brake rod 29) is displaced to the rear brake non-operating position.

In the transaxles 4L and 4R having the above-described configuration, hydraulic oil can be supplied to the left and right speed control sets 100L and 100R by turning the solenoid valve 33 of the hydraulic actuator 30 ON and Off. Therefore, in the transaxles 4L and 4R, the speed control set 100 can be brought into the standby state in accordance with the releasing operation of the parking brake device 2, and linkage between the parking brake device 2 and the speed control set 100 can be established with a simple configuration realized by the hydraulic circuit.

That is, in the parking brake device 2, when the parking brake mechanism 20 is operated, the spring member 35 becomes an operation mechanism of the parking brake mechanism 20 and the parking brake mechanism 20 can be operated by the biasing force of the spring member 35. When the parking brake mechanism 20 is not operated, the hydraulic actuator 30 becomes an operation mechanism of the parking brake mechanism 20, the solenoid valve 33 is excited, and the parking brake mechanism 20 is brought into the non-operating state by displacing the piston 32 by pressure of the hydraulic oil.

A configuration in which the parking brake device 2 and the speed control set 100 are operated by the control levers 13L and 13R will be described below.

Figure 12A:
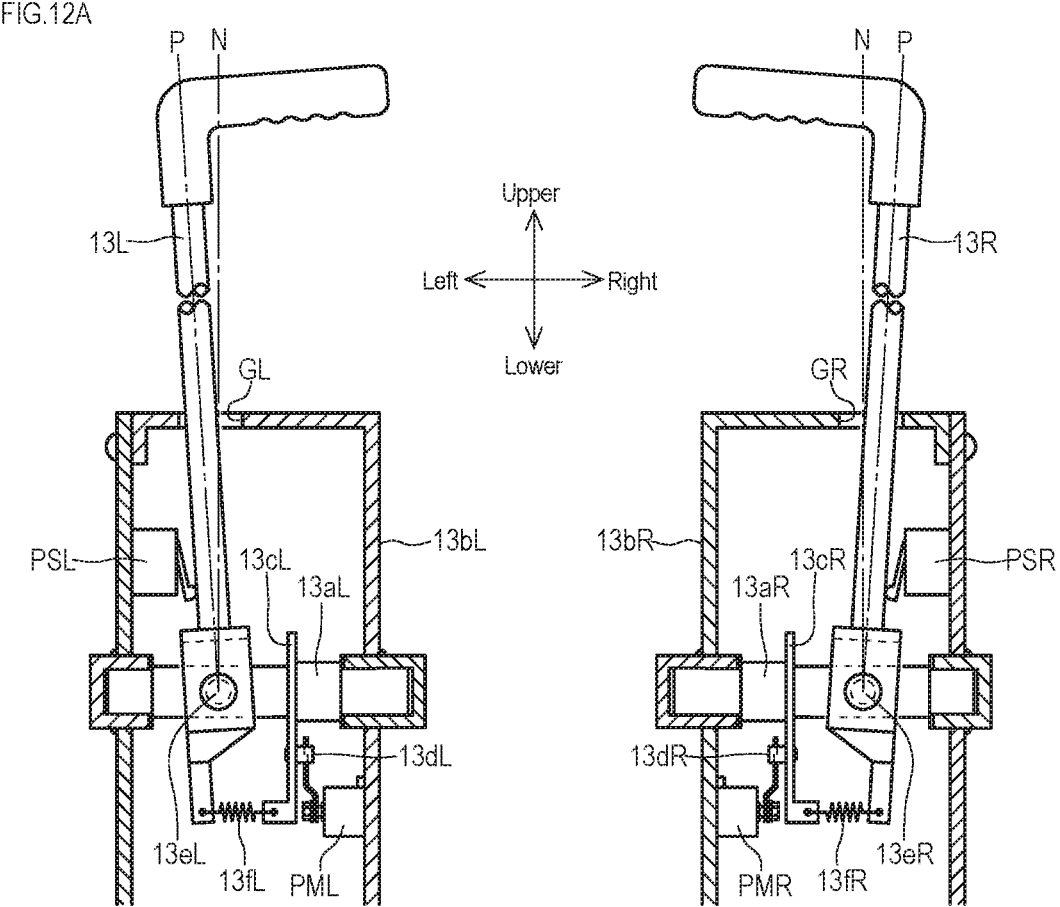
Figure 12B:
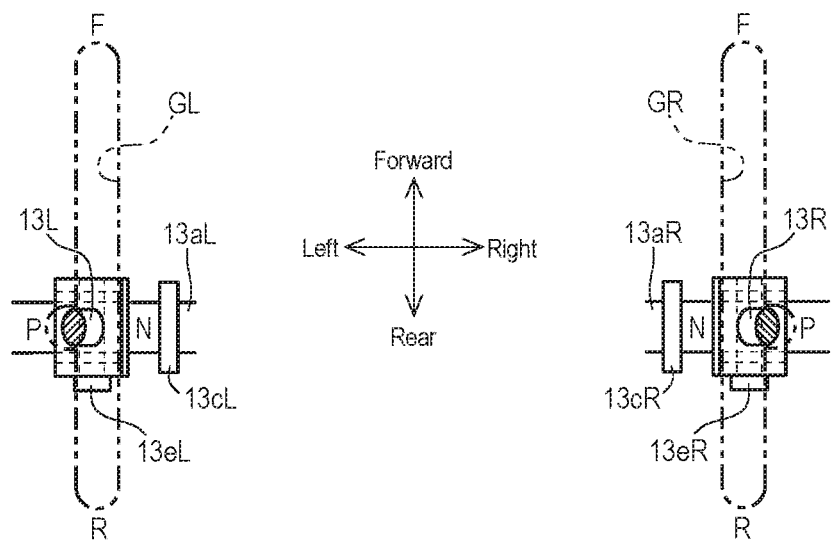

As shown in FIGS. 12A and 12B, the control lever 13L in this case supports a first turning shaft 13aL of the control lever 13L, and the control lever 13L can turn in the longitudinal direction toward a forward movement position (F) and a rearward movement position (R) along a lever guide GL which is formed on a cover 13bL covering the first turning shaft 13aL. An arm 13cL projects from the first turning shaft 13aL in a direction intersecting with the axial direction at right angles, and the arm 13cL and the potentiometer PML are connected to the first turning shaft 13aL through a link mechanism 13dL. According to such a configuration, a turning amount of the arm 13cL is input to a potentiometer PML, and an operation signal corresponding to the turning amount is input to a controller 38 by the potentiometer PML. The potentiometer PML detects a running speed and a running direction intended by the driver based on an operation amount and an operation direction of the control lever 13L. The controller 38 sends signals to the speed control sets 100L in accordance with the operation signal, and determines output of the hydraulic pump 43 in the transaxle 4L.

The control lever 13L and the first turning shaft 13aL can turn around a second turning shaft 13eL through the second turning shaft 13eL which is a rotation shaft intersecting with the first turning shaft 13aL at right angles. The control lever 13L can turn leftward toward a parking position (P) along the lever guide GL at a neutral (N) position. A lower end of the control lever 13L is provided with a spring member 13fL which biases the control lever 13L in a turning direction toward the parking position (P). A left switch PSL is placed in the cover 13bL. By turning the control lever 13L from the neutral (N) to the parking position (P), a left portion of the control lever 13L pushes the left switch PSL.

The control lever 13R in this case supports the first turning shaft 13aR of the control lever 13R, and the control lever 13R can turn in the longitudinal direction toward the forward movement position (F) and the rearward movement position (R) along a lever guide GR formed on a cover 13bR which covers the first turning shaft 13aR. An arm 13cR projects from the first turning shaft 13aR in a direction intersecting with the axial direction at right angles, and the arm 13cR and a potentiometer PMR are connected to the first turning shaft 13aR through a link mechanism 13dR. According to such a configuration, a turning amount of the arm 13cR is input to the potentiometer PMR, and an operation signal corresponding to the turning amount is input to the controller 38 by the potentiometer PMR. The potentiometer PMR detects a running speed and a running direction intended by the driver based on an operation amount and an operation direction of the control lever 13R. The controller 38 sends a signal to the speed control set 100R in accordance with the operation signal, and determines output of the hydraulic pump 43 in the transaxle 4R.

The control lever 13R and the first turning shaft 13aR can turn around a second turning shaft 13eR through the shaft 13eR which is a rotation shaft intersecting with the first turning shaft 13aR at right angles. The control lever 13R can turn rightward toward the parking position (P) along the lever guide GR at the neutral (N) position. A lower end of the control lever 13R is provided with a spring member 13fR which biases the control lever 13R toward the parking position (P). A right switch PSR is placed in the cover 13bR. By turning the control lever 13R from the neutral (N) to the parking position (P), a right portion of the control lever 13R pushes the right switch PSR.

Figure 13:
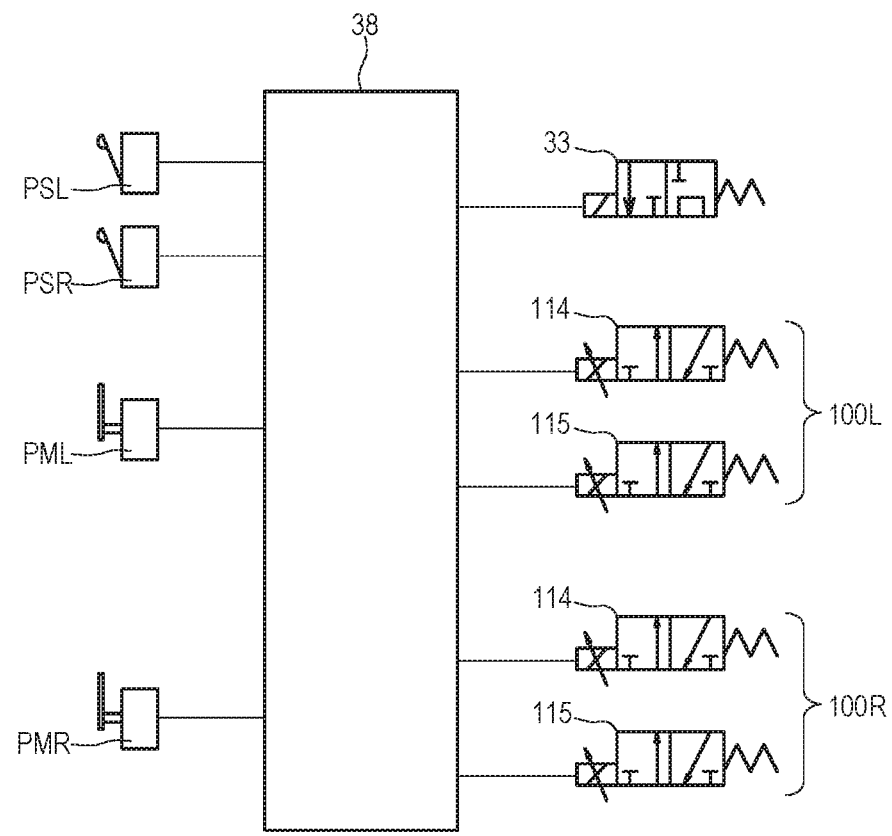
FIG. 13 is a control block diagram showing a relation between switches and solenoid valves around the control levers.

As shown in FIG. 13, the left and right switches PSL and PSR are electrically connected to the controller 38. For example, if both the left and right switches PSL and PSR are "ON", the solenoid valve 33 is switched to a "non-excitation" state by a command signal sent from the controller 38, and if both the left and right switches PSL and PSR are "OFF", the solenoid valve 33 is switched to an "excitation" state. In the parking brake device 2, it is also possible to employ such a configuration that the left and right control levers 13L and 13R are opened laterally outward, a parking brake pedal (not shown) is provided, and a driver steps on the parking brake pedal instead of operating the parking brake device 2.

Next, a second embodiment of the hydraulic transaxle of a working vehicle 1 will be described.

Figure 14:
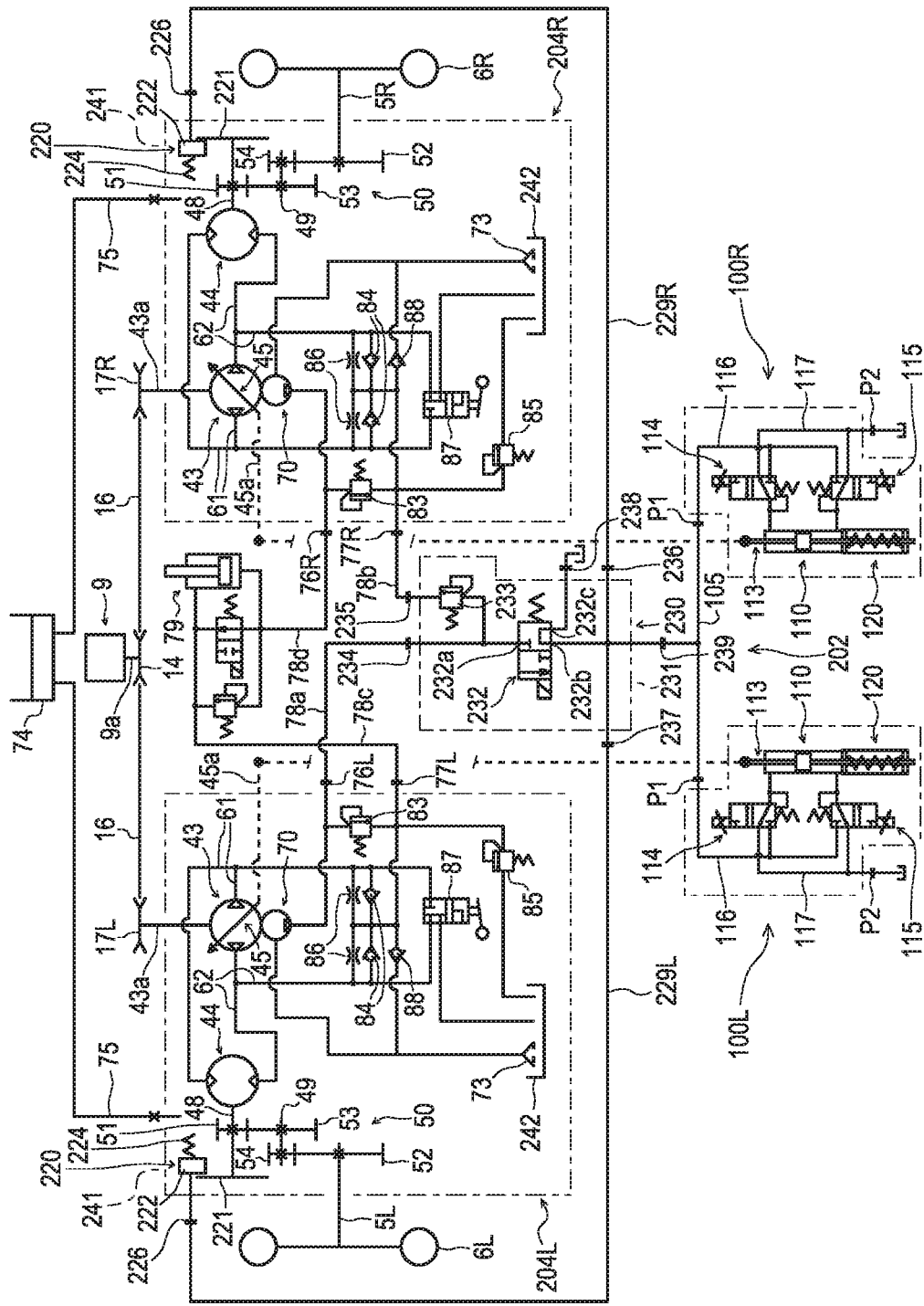
FIG. 14 is a hydraulic circuit diagram of a working vehicle having transaxles according to a second embodiment of the present invention.
Figure 15:
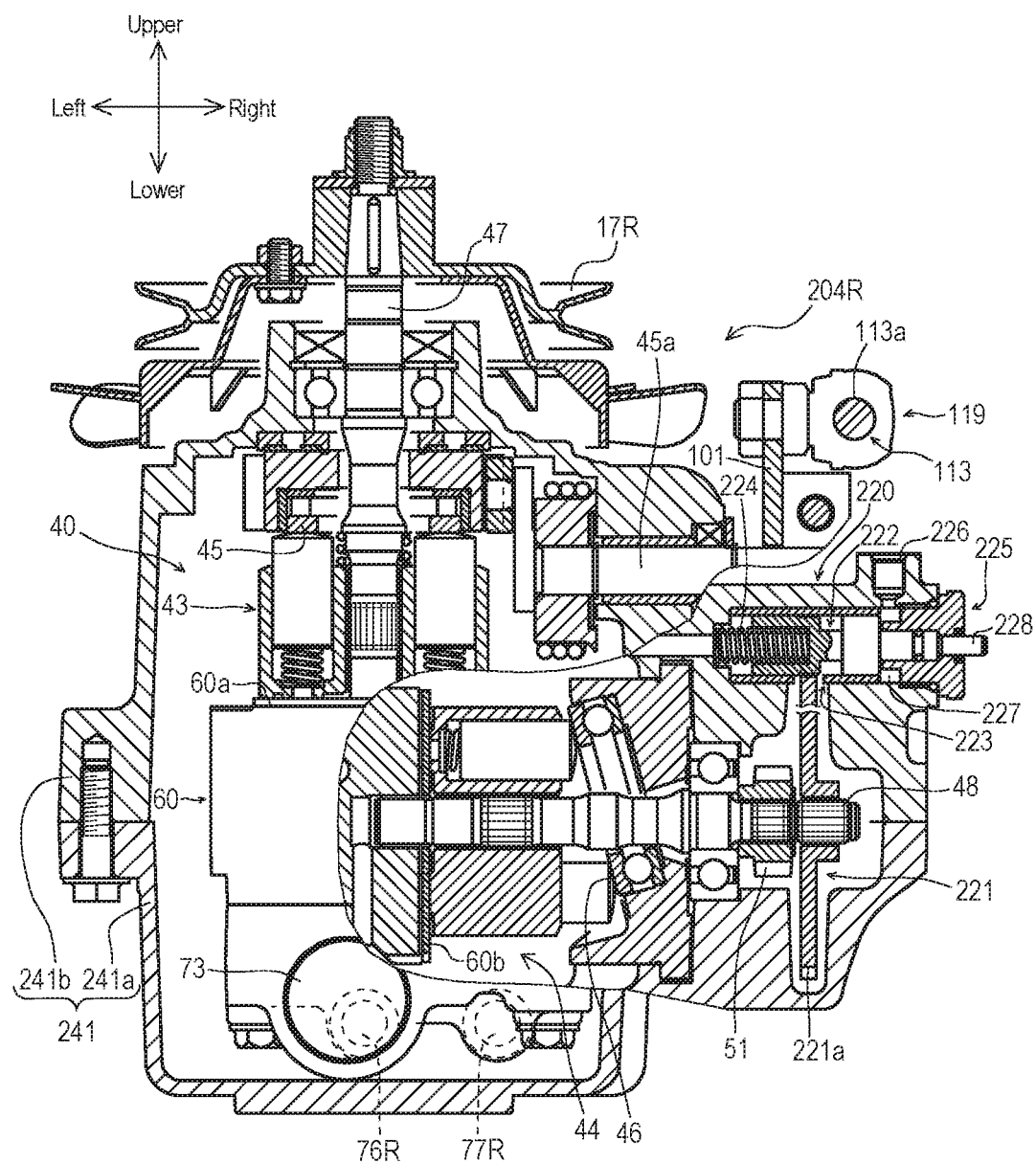
FIG. 15 is an enlarged side view of the right transaxle according to the second embodiment of the present invention.

In the working vehicle 1, it is possible to employ transaxles 204L and 204R as shown in FIGS. 14 and 15 instead of the above-described transaxles 4L and 4R. The transaxles 204L and 204R are different from the transaxles 4L and 4R in that the devices 204L and 204R have a parking brake device 202. In the transaxles 204L and 204R, the same symbols as those of the transaxles 4L and 4R are allocated to members which are common to those of the transaxles 4L and 4R.

As shown in FIG. 14, the parking brake device 202 configures the transaxles 204L and 204R according to the second embodiment. The parking brake device 202 includes a parking brake mechanism 220 and a valve unit 230. Since the left and right transaxles 204L and 204R are laterally symmetric in structure, the parking brake mechanism 220 constituting the right transaxle 204R will mainly be described in the present embodiment.

Figure 16:
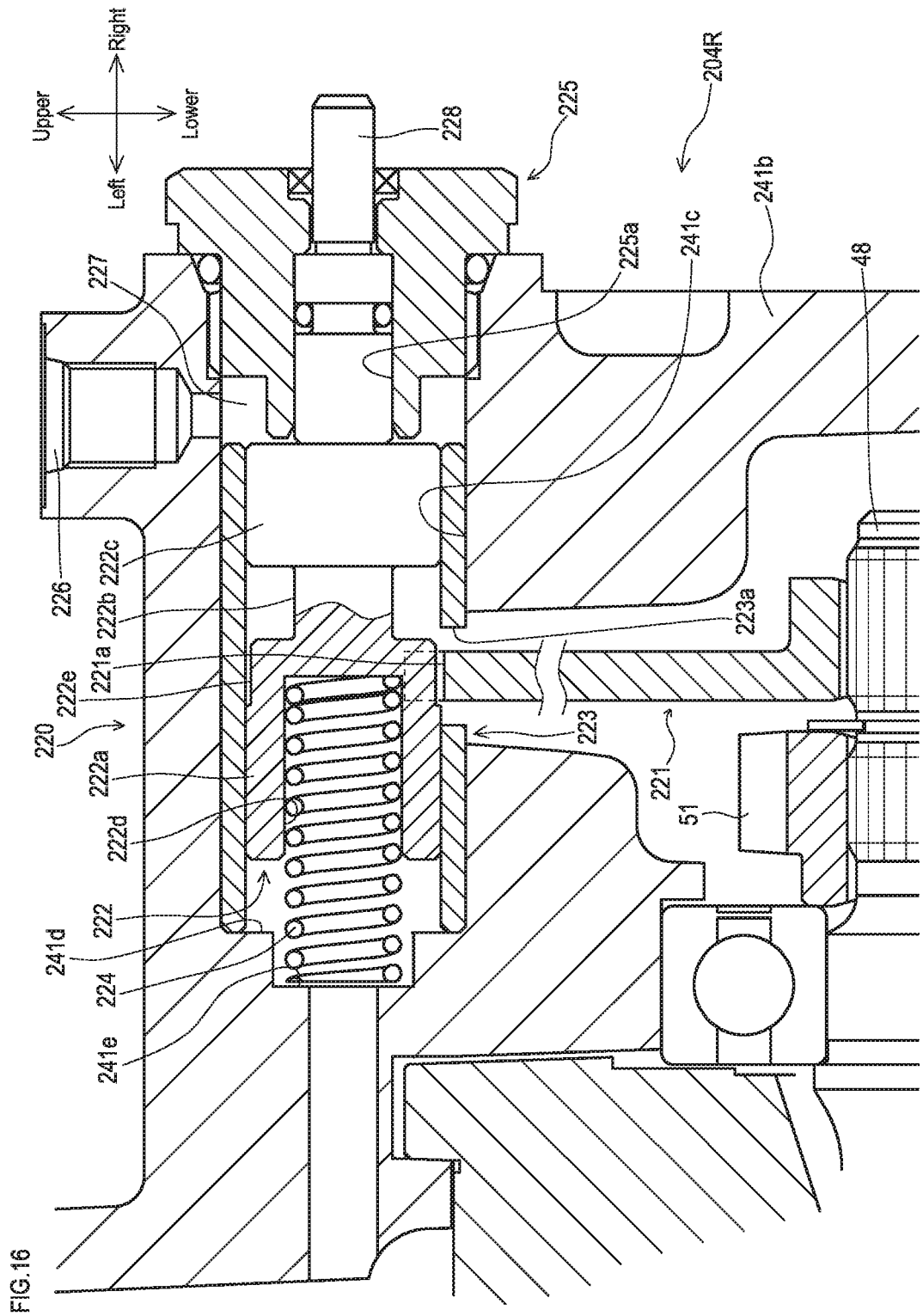
FIG. 16 is an enlarged partial sectional view, when viewed from rear, showing a parking brake mechanism according to the second embodiment.

As shown in FIGS. 14 to 16, in the parking brake device 202, the controller 38 (see FIG. 13) detects operations of the control levers 13L and 13R (see FIGS. 1 and 12), and the controller 38 causes a later-described locking member to be driven to one of two positions.

The parking brake mechanism 220 is for restricting output of the hydraulic motor 44 in the transaxles 204R. The parking brake mechanism 220 is composed of a brake rotor 221, a locking member 222, a collar member 223, a spring member 224 and the like, and is provided in a housing 241 of the transaxles 204R.

The brake rotor 221 is a substantially disk-shaped member. The brake rotor 221 is fixed to a portion of A motor shaft 48 which projects from a motor output gear 51, and can rotate coaxially with the motor shaft 48. Recesses 221a are formed in the brake rotor 221 by notching an outer peripheral edge thereof substantially on an arc at equal distances from one another. Notching directions of the recesses 221a are parallel to a rotation shaft of the brake rotor 221.

The locking member 222 is for locking, or preventing the rotation of, the brake rotor 221. A locking portion 222a, a non-locking portion 222b, and a cylinder portion 222c are formed in the locking member 222. The locking portion 222a and the cylinder portion 222c have substantially cylindrical outer shapes. The non-locking portion 222b is formed as a constricted portion between the locking portion 222a axial direction the cylinder portion 222c. The locking portion 222a and the cylinder portion 222c have outer diameters which substantially coincide with (however, slightly smaller than) an inner diameter of the substantially cylindrical collar member 223. The locking member 222 can be displaced in an axial direction of the cylindrical collar member 223 in a state where the locking member 222 is inserted into the collar member 223. The locking member 222 is placed at a position on a locus drawn or formed by arc centers of the recesses 221a of the brake rotor 221 where an axis of the locking member 222 substantially coincides as viewed in the axial direction.

A radius of curvature of an outer peripheral surface of the locking portion 222a of the locking member 222 as viewed from the axial direction is slightly smaller than a radius of curvature of an inner peripheral surface of the recess 221a. Hence, the locking portion 222a can be engaged in the recess 221a by displacing the locking member 222 to a position where the locking portion 222a and the recess 221a are superposed on each other as viewed from a direction intersecting with the axial direction of the locking member 222 at right angles. A diameter-reduced portion 222e is formed in a portion of the locking portion 222a of the locking member 222. The diameter-reduced portion 222e is a portion where a clearance from the recess 221a is increased to reliably engage with and disengage from the recess 221a of the locking portion 222a.

The collar member 223 has an outer diameter which substantially coincides with (however, slightly smaller than) an inner diameter of a mounting hold 241c formed in the lower half housing 241b, and the collar member 223 is engaged and inserted into the mounting hold 241c. An axial direction of the mounting hold 241c is parallel to an axial direction of a rotation shaft of the brake rotor 221 (i.e., motor shaft 48). An axial direction of the collar member 223 which is engaged and inserted into the mounting hold 241c is also parallel to an axial direction of the rotation shaft of the brake rotor 221. The collar member 223 is inserted into the mounting hold 241c to a position where the collar member 223 abuts against a step portion 241d which is a step portion formed closer to an opening end than a bottom 241e.

A notch 223a is formed in a portion of an outer peripheral surface of the collar member 223. The locking portion 222a and the non-locking portion 222b of the locking member 222 which is inserted into the collar member 223 are exposed downward from the notch 223a. The recesses 221a formed around the outer peripheral edge of the brake rotor 221 are inserted and placed in the collar member 223 from the notch 223a. The brake rotor 221 can rotate while crossing the recesses 221a with respect to an axial direction of the collar member 223.

The spring member 224 is a coil spring-shaped elastic member for applying a spring force to the locking member 222. The spring member 224 is placed in the mounting hold 241c together with the locking member 222 in a state where one end of the spring member 224 in its expansion and contraction direction is inserted into a hole portion 222d formed in the locking member 222. The spring member 224 is placed between a bottom 241e of the mounting hold 241c and the locking member 222 in a state where the spring member 224 is contracted shorter than its steady length.

An opening end of the mounting hold 241c is sealed by a plug 225 and the mounting hold 241c includes a supply/discharge port 226. The parking brake mechanism 220 is formed in the lower half housing 241b, and includes a supply/discharge port 226 which is in communication with the mounting hold 241c. The supply/discharge port 226 is in communication with an oil chamber 227 formed between the plug 225 and the cylinder portion 222c of the locking member 222. The supply/discharge port 226 can supply and discharge hydraulic oil to and from the oil chamber 227 through the supply/discharge port 226.

The parking brake mechanism 220 includes a push pin 228 which is a pushing part for pushing the locking member 222. The push pin 228 is inserted into a pin hole 225a formed at an axial position of the plug 225. The push pin 228 can be reciprocated and displaced along the pin hole 225a. The locking member 222 can be displaced to a deep side of the mounting hold 241c through the push pin 228 by pushing the push pin 228 into the mounting hold 241c. Displacement of the locking member 222 placed in the mounting hold 241c toward the opening end of the mounting hold 241c is restricted at a position where the locking member 222 abuts against the push pin 228 which is inserted into the pin hole 225a. Displacement of the locking member 222 toward the bottom 241e of the mounting hold 241c is restricted at a position where the locking member 222 abuts against the step portion 241d.

Figure 18A:
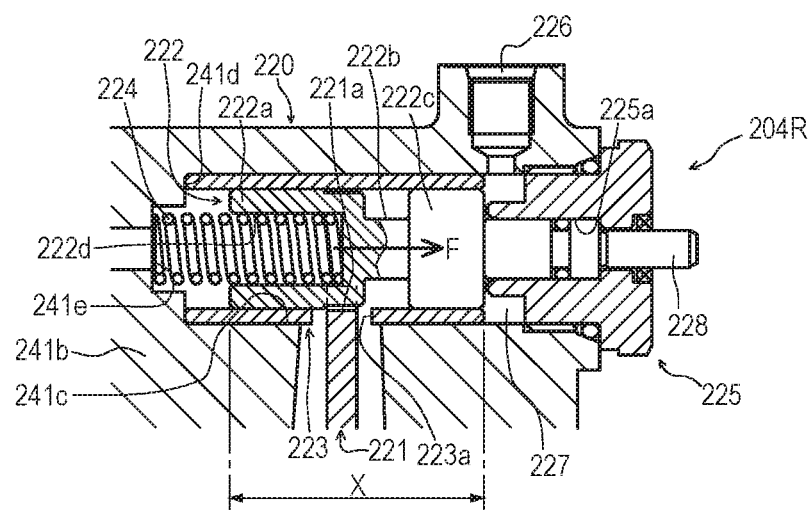
Figure 18B:
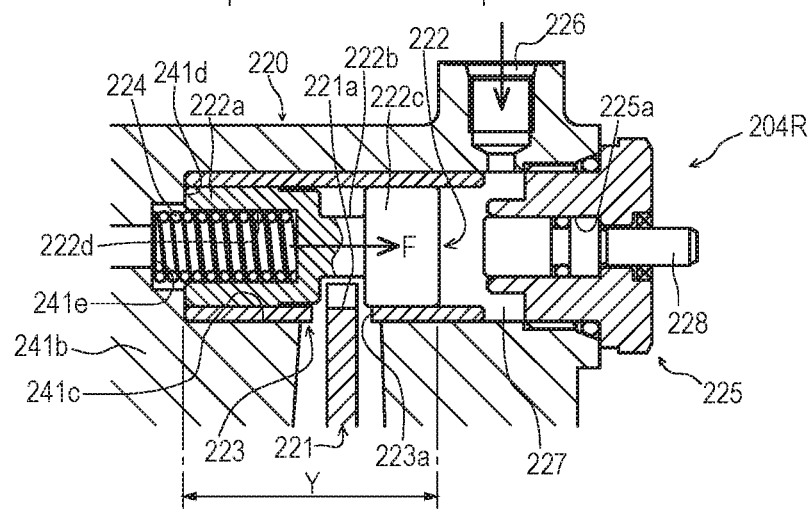

In the parking brake mechanism 220 having the above-described configuration, the locking member 222 can be displaced between two positions, i.e., a first position X and a second position Y as shown in FIGS. 18A and 18B. As shown in FIG. 18A, the first position X shows a state where the locking member 222 causes the parking brake mechanism 220 to operate (i.e., when parking brake device 2 is effective). As shown in FIG. 18B, the second position Y shows a state where the locking member 222 causes the parking brake mechanism 220 not to operate (i.e., when parking brake device 2 is not effective).

When the locking member 222 is located at the first position X as shown in FIG. 18A, the locking portion 222a of the locking member 222 is located in the notch 223a and engaged with the recess 221a of the brake rotor 221, and does not rotate the brake rotor 221.

When the locking member 222 is located at the second position Y as shown in FIG. 18B, the non-locking portion 222b of the locking member 222 is located in the notch 223a, and the locking member 222 is not engaged with the recess 221a of the brake rotor 221 and permits rotation of the brake rotor 221.

Configurations of embodiments of the transaxles 204L and 204R will be described below.

As shown in FIGS. 14 to 16, ports 76L, 76R, 77L, and 77R are provided in housings 241 of the left and right transaxles 204L and 204R. The oil output port 76L is connected to the oil input port 77R in a crossing manner and the oil output port 76R is connected to the oil input port 77L in a crossing manner through a pair of outer pipings, i.e., a first oil passage composed of oil passages 78a and 78b and a second oil passage composed of oil passages 78c and 78d. As described above, one of the left and right transaxles 204L and 204R can supply charge oil to the other of the transaxles 204L and 204R by the charge pumps 70 and 70 respectively provided in the transaxles 204L and 204R.

In the transaxles 204L and 204R, the valve unit 230 is placed on a path of the oil passages 78a and 78b which are the first oil passage. Pressure of hydraulic oil supplied to the valve unit 230 is adjusted by an implementation pressure adjusting valve 83 provided on the side of the transaxles 204L.

Figure 17:
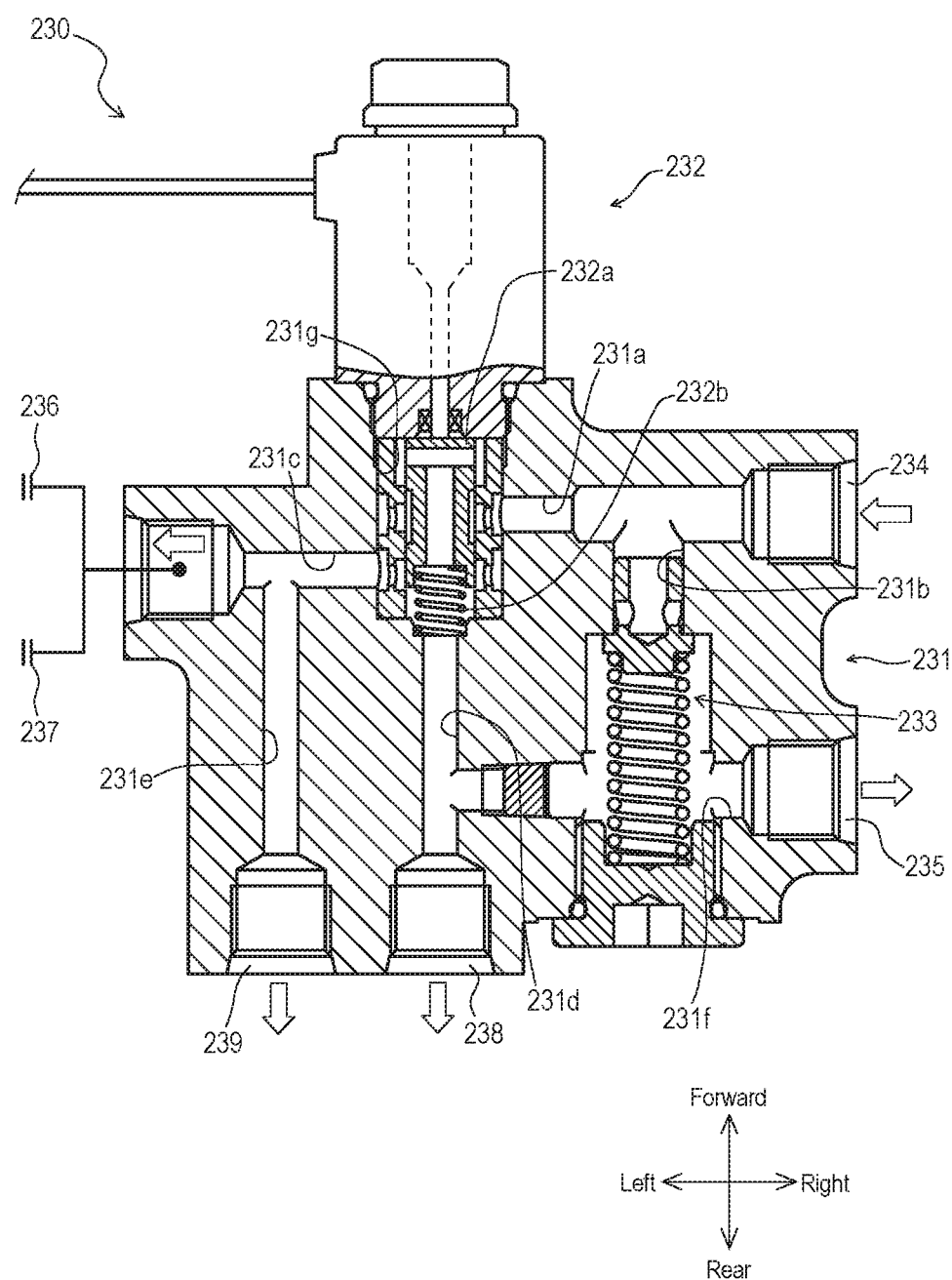
FIG. 17 is a sectional plan view of a valve unit according to the second embodiment.

The valve unit 230 in the parking brake device 202 will be described below. As shown in FIGS. 14 and 17, the valve unit 230 is a valve device for switching the operation of the parking brake mechanism 220, and is composed of a valve body 231, a solenoid valve 232, a relief valve 233, and the like.

The valve body 231 is a casing for accommodating the valves 232 and 233. Ports 234, 235, 236, 237, 238, and 239 for supplying and discharging hydraulic oil to and from the valves 232 and 233 are formed in an outer surface of the valve body 231. Oil passages 231a, 231b, 231c, 231d, 231e and 231f, and a mounting hole 231g are formed in the valve body 231.

The port 234 is a port to which hydraulic oil from the transaxle 204L is supplied. The port 234 is in communication with the mounting hole 231g of the solenoid valve 232 through the oil passage 231a. The port 234 is connected to the oil output port 76L of the transaxles 204L through the oil passage 78a.

The port 235 is for returning hydraulic oil to the transaxle 204R. The port 235 is in communication with the mounting hole 231g of the solenoid valve 232 through the oil passage 231b, and is connected to the oil input port 77R of the transaxles 204R through the oil passage 78b. The relief valve 233 which sets a brake-releasing force is provided on the oil passage 231b. If the solenoid valve 232 is not excited, pressure of hydraulic oil becomes high in the oil passage 231a, the relief valve 233 is operated and an entire amount of hydraulic oil supplied to the port 234 is returned to the port 235.

The port 236 is for supplying hydraulic oil to the parking brake mechanism 220 of the transaxles 204R. The port 236 is in communication with the mounting hole 231g of the solenoid valve 232 through the oil passage 231c, and is connected to the supply/discharge port 226 of the transaxles 204R through the oil passage 229R.

The port 237 is for supplying hydraulic oil to the parking brake mechanism 220 of the transaxles 204L. The port 237 is in communication with the mounting hole 231g of the solenoid valve 232 through the oil passage 231c, and is connected to the supply/discharge port 226 of the transaxles 204L through the oil passage 229L.

The port 238 is for discharging hydraulic oil from the valve body 231. The port 238 is in communication with the mounting hole 231g of the solenoid valve 232 through the oil passage 231d, and is in communication with an oil reservoir 242 of the housing 241.

The port 239 is for supplying hydraulic oil to speed control sets 100L and 100R. The port 239 is in communication with the mounting hole 231g of the solenoid valve 232 through the oil passages 231e and 231c. The port 239 is connected to the inlet ports P1 and P1 of the speed control sets 100L and 100R through the oil passage 105.

The oil passages 231a and 231b bring the port 234 into communication with the ports 236, 237 and 238, and the mounting hole 231g of the solenoid valve 232 is placed between the oil passages 231a and 231b. According to such a configuration, it is possible to switch between supply and stop of hydraulic oil from the oil passage 231a to the oil passage 231b by switching the solenoid valve 232.

The solenoid valve 232 includes a valve body 232a and a spring member 232b. The solenoid valve 232 is threadedly provided in the mounting hole 231g formed in the valve body 231, and the valve body 232a is placed in the mounting hole 231g. The valve body 232a is displaced in the mounting hole 231g by bringing the valve body 232a into an excited state and a non-excited state. When the solenoid valve 232 is brought into the non-excited state, the valve body 232a is biased by the spring member 232b, and the valve body 232a is displaced to an upper position in FIG. 17. The oil passages 231a and 231d are not brought into communication with each other by the valve body 232a, the oil passages 231a and 231d are brought into communication with each other by the valve body 232a, and the solenoid valve 232 is "closed". When the solenoid valve 232 is "closed", the oil passages 231c, 231d and 231e are brought into communication with the mounting hole 231g, hydraulic oil supplied from the ports 236, 237 and 239 is returned toward the valve body 231, and the hydraulic oil can be returned from the port 238 to the oil reservoir 242.

When the solenoid valve 232 is brought into the excited state, the valve body 232a is displaced to a lower position in FIG. 17 against a spring force of the spring member 232b, the oil passage 231a and 231c are brought into communication with each other, the oil passages 231a and 231d are brought into communication with each other, and the solenoid valve 232 is "opened".

Operation of the valve unit 230 will be described below.

As shown in FIGS. 14 and 17, in the valve unit 230, hydraulic oil supplied from the charge pump 70 of the transaxles 204L is input to the port 234 of the valve unit 230 through the oil output port 76L and the oil passage 78a. In the valve unit 230, when the solenoid valve 232 is "closed", the relief valve 233 opens, and surplus pressure oil is returned to a charge line of the transaxles 204R. In the valve unit 230, when the solenoid valve 232 is "opened", hydraulic oil is supplied to a secondary side of the valve unit 230, and hydraulic oil is simultaneously supplied to the parking brake mechanism 220 through the ports 236 and 237 and the oil passages 229R and 229L, and through the supply/discharge port 226.

In the valve unit 230, when the solenoid valve 232 is "closed", hydraulic oil in the parking brake mechanism 220 of the transaxles 204L and 204R is simultaneously discharged from the port 238 into the housing 241 through the supply/discharge port 226, the oil passages 229L and 229R and a discharge port 232c of the solenoid valve 232.

That is, the transaxles 204L and 204R include housings 241 on the left and right sides which incorporate continuously variable transmissions 40 for continuously variably speed-changing the left and right axles 5L and 5R independently. The oil-supply mechanism are the charge pumps 70 which include the continuously variable transmission 40. The oil output ports 76L and 76R for taking a supply system of hydraulic oil from the charge pump 70 to outside of the housing 241, and the oil input ports 77L and 77R which are in communication with the replenishing system of hydraulic oil to the continuously variable transmission 40 open from outer surfaces of the left and right housings 241. The transaxles include the pair of oil passages 78a and 78d and the pair of oil passages 78c and 78b which respectively connect the oil output ports 76L and 76R of one of the left and right housings 241 and the oil input ports 77L and 77R of the other housing 241 to each other, and the single valve unit 230 which supplies hydraulic oil to the left and right locking members 222 and 222 and which discharges hydraulic oil supplied to the left and right locking members 222 and 222 on the way to the oil passages 78a and 78d of the pair of oil passages 78a and 78d and the pair of oil passages 78c and 78b.

According to the transaxles 204L and 204R having the above-described configuration, charge oil for cooling the continuously variable transmission 40 is utilized as a hydraulic power source for releasing the parking brake mechanism 220. According to this, it is possible to easily provide the parking brake mechanisms 220 in the transaxles 204L and 204R.

Operation of the parking brake device 202 will be described below with reference to FIG. 14.

If a driver artificially outputs a parking command through the control levers 13L and 13R, a command signal is output from the controller (not shown) to the valve unit 230, the solenoid valve 232 of the valve unit 230 is "opened", hydraulic oil is supplied to the supply/discharge port 226 of the transaxles 204R through the port 236 and the oil passage 229R, and hydraulic oil is supplied to the supply/discharge port 226 of the transaxles 204L through the port 237 and the oil passage 229L. At this time, in the parking brake mechanism 220, the locking member 222 is displaced to the first position X by hydraulic pressure supplied to the oil chamber 227 as shown in FIG. 18A, and the locking portion 222a of the locking member 222 is engaged in the recess 221a of the brake rotor 221. In embodiments, valve unit 230, which may be an on-off valve, is located at a point closer to charge pump 70 on oil passage 78a than both the connecting point between oil passages 229L and 229R and oil passage 78a and the connecting point between oil passage 116 and oil passage 78a. According to this, the parking brake device 202 becomes effective.

In the parking brake device 202, if the driver artificially releases the parking brake through the control levers 13L and 13R, a command signal is output to the valve unit 230 by the controller (not shown), the solenoid valve 232 of the valve unit 230 is "closed", hydraulic oil is returned into the housing 241 from the parking brake mechanism 220 on the side of the transaxles 204L and from the port 238 through the supply/discharge port 226, the oil passage 229L and the discharge port 232c of the solenoid valve 232, and hydraulic oil is returned into the housing 241 from the parking brake mechanism 220 of the transaxles 204R and from the port 238 through the supply/discharge port 226, the oil passage 229R and the discharge port 232c of the solenoid valve 232. At this time, in the parking brake mechanism 220, hydraulic pressure in the oil chamber 227 is lowered as shown in FIG. 18B, the locking member 222 is displaced to the second position Y by a biasing force F of the spring member 224, and the non-locking portion 222b of the locking member 222 is placed in the recess 221a of the brake rotor 221. According to this, the parking brake device 202 is released.

That is, in the transaxles 204L and 204R, the locking member 222 can be displaced to the second position Y against the biasing force F of the spring member 224 by hydraulic pressure which is supplied by drawing oil stored in the housing 241. The charge pump 70 of the transaxles 204L is utilized using an hydraulic pressure generation source at this time.

In the parking brake device 202, if the prime mover 9 stops and supply of hydraulic oil by the charge pump 70 disappears and the hydraulic pressure in the oil chamber 227 is reduced, the locking member 222 is displaced from the second position Y to the first position X by the biasing force F of the spring member 224, and the parking brake device 202 becomes effective. In the parking brake device 202, when the prime mover 9 of the working vehicle 1 stops in this manner, the parking brake device 202 automatically becomes effective. Therefore, usability is excellent.

That is, the hydraulic transaxles 204L and 204R include the housings 241 which support the axles 5L and 5R and in which oil is stored, the hydraulic continuously variable transmissions 40 which use the oil as hydraulic oil, the reduction gear trains 50 which transmit rotations of the continuously variable transmissions 40 to the axles 5L and 5R, and the parking brake mechanisms 220 which restrict rotation of the axles 5L and 5R. Each of the parking brake mechanism 220 includes the disk-shaped brake rotor 221 which is provided on the motor shaft 48 constituting the reduction gear train 50 and which can rotate around the motor shaft 48 coaxially with the motor shaft 48, the locking member 222 which can be displaced to the first position X where the brake rotor 221 is locked and the second position Y where the brake rotor 221 is unlocked, and the spring member 224 which always biases the locking member 222 to the first position X. The locking member 222 includes the locking portion 222a which is engaged in the recess 221a formed in the brake rotor 221 and which locks the brake rotor 221 in the first position X, and the non-locking portion 222b which is placed in a position corresponding to the recess 221a the second position Y and which separates from the brake rotor 221 in the second position Y. Each of the hydraulic transaxles includes a charge pump 70 which can displace the locking member 222 to the second position Y against the biasing force F of the spring member 224 by hydraulic pressure.

According to the transaxles 204L and 204R having the above-described configuration, the parking brake mechanisms 220 can be made compact without using a complicated link mechanism and the like.

Figure 18C:
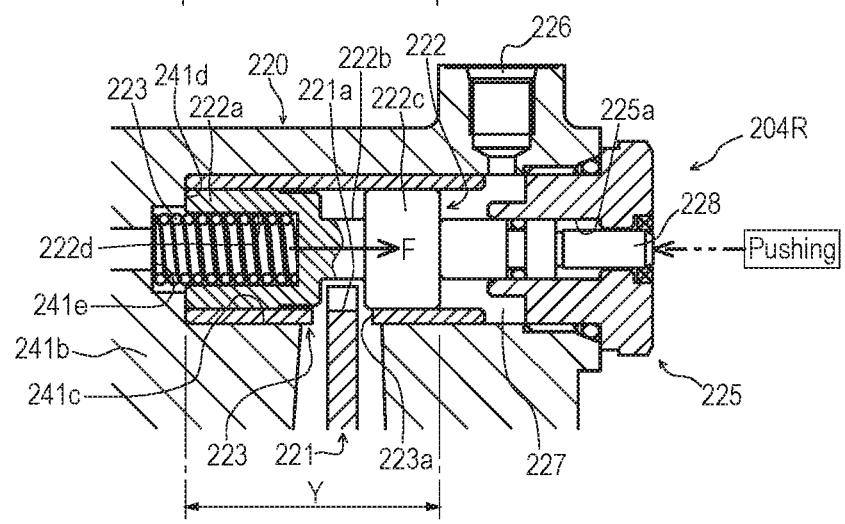

Further, in the parking brake device 202, as shown in FIG. 18C, the locking member 222 is mechanically displaced to the second position Y if a driver pushes the push pin 228, and the parking brake device 202 can forcibly be released by operation of the driver. Although it is not illustrated in the drawings, it is possible to add a mechanism (e.g., hydraulic cylinder, air cylinder, electric actuator and the like) which assists the driver's pressing operation of the push pin 228. If the driver's pressing force on the push pin 228 disappears, the locking member 222 is returned to the first position X by the biasing force F of the spring member 224, and the parking brake device 202 becomes effective.

That is, in the parking brake device 202, when the parking brake mechanism 220 is operated, the spring member 224 becomes the operation mechanism of the parking brake mechanism 220, the parking brake mechanism 220 is operated by a biasing force of the spring member 224, and when the parking brake mechanism 220 is not operated, the valve unit 230 becomes the operation mechanism of the parking brake mechanism 220, and the parking brake mechanism 220 is brought into the non-operated state by exciting the solenoid valve 232 and displacing the locking member 222 by pressure of the hydraulic oil.

Next, a third embodiment of the hydraulic transaxles will be described.

Figure 19:
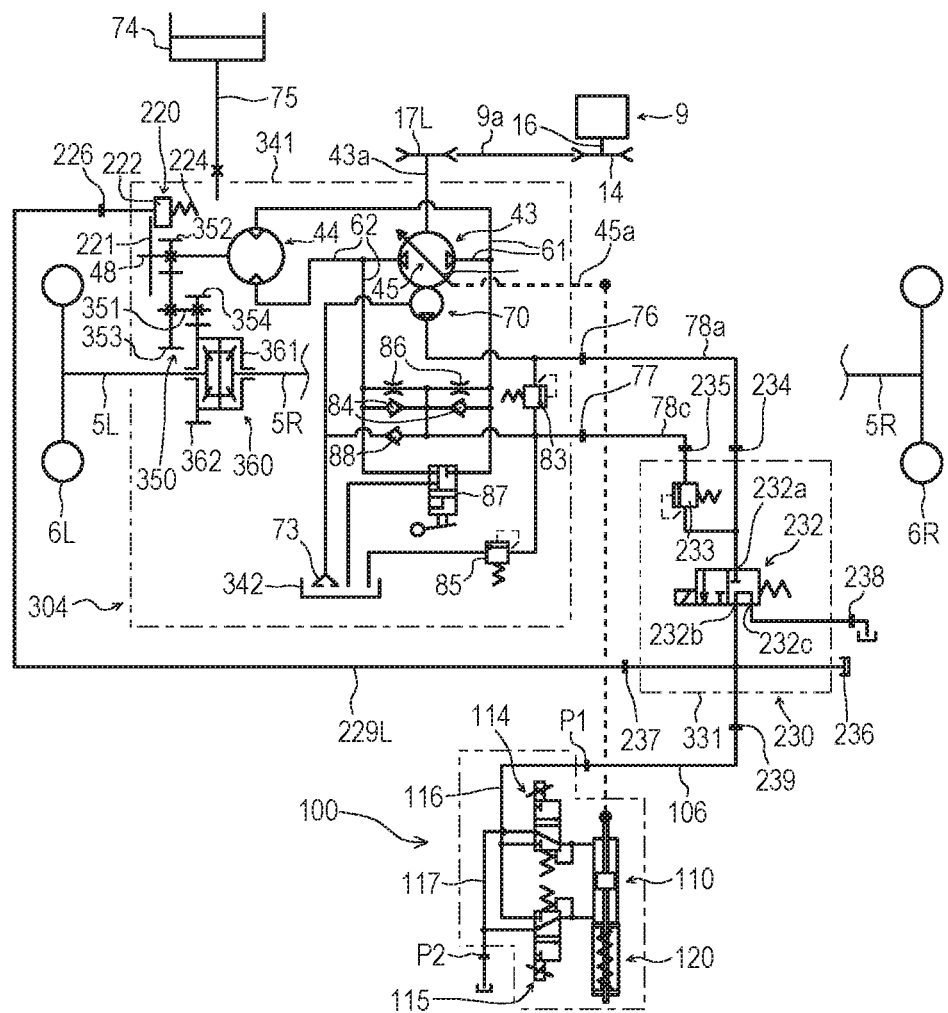
FIG. 19 is a hydraulic circuit diagram of a working vehicle having transaxles according to a third embodiment of the present invention.

In a working vehicle having a circular steering wheel, it is possible to employ a transaxle 304 as shown in FIG. 19 instead of the above-described transaxles 204L and 204R. The transaxle 304 shown in this embodiment is provided in the vicinity of a left axle 5L and a rear wheel 6L of a working vehicle 1, and a driving force is transmitted to a right axle 5R and a rear wheel 6R by a differential mechanism. The transaxle 304 is not a pair of left and right devices unlike the above-described transaxles 4L and 4R and the transaxles 204L and 204R and thus, the transaxle 304 has such a simple configuration that the working vehicle cannot turn in a state where its turning radius is effectively zero (zero turn).

The transaxle 304 includes the above-described speed control set 100, parking brake mechanism 220, and valve unit 230. The transaxle 304 does not use the port 236 of the valve unit 230.

The transaxle 304 includes, in its housing 341, the motor shaft 48 of the hydraulic motor 44 and a counter shaft 351 in parallel to the axle 5R, and a series of reduction gear train 350 is provided in the transaxle 304 at a location from the motor shaft 48 to the axle 5R. In the reduction gear train 350, the motor shaft 48 is provided with a motor output gear 352, and the counter shaft 351 is provided with a large-diameter gear 353 and a final pinion 354. The axle 5R is provided with a differential mechanism 360 having a differential case 361. Variable speed power from the hydraulic motor 44 is reduced in speed through the differential mechanism 360 such that a ring gear 362 provided around an outer periphery of the differential case 361 and a final pinion 354 are meshed with each other, and the power is transmitted to the axles 5L and 5R.

Outward opening ports 76 and 77 are provided in the housing 341 of the transaxle 304. The port 76 is connected to a discharge side of the charge pump 70, and the port 77 is connected to a charge line of the hydraulic continuously variable transmission 40. That is, the port 76 is an oil output port 76 which outputs oil discharged from the charge pump 70 of the transaxle 304 to outside, and the port 77 is an oil output port 77 which inputs, from outside, oil which is to be returned to the charge pump 70 of the transaxle 304. The oil output port 76 is connected to a port 235 of the valve unit 230 through an oil passage 78a, and the oil output port 77 is connected to a port 234 of the valve unit 230 through an oil passage 78c.

Operation of the parking brake device 202 in the transaxle 304 will be described with reference with FIG. 19.

In the parking brake device 202 in its brake non-operated state, if a driver artificially releases a parking command, the solenoid valve 232 of the valve unit 230 is brought into the non-excited state, supply of hydraulic oil from the port 237 to the supply/discharge port 226 is stopped, and the parking brake mechanism 220 is brought into the non-operated state.

In the parking brake device 202 in its brake operated state, if the driver artificially outputs the parking command, the solenoid valve 232 of the valve unit 230 is excited, hydraulic oil is supplied from the port 237 to the supply/discharge port 226, and the parking brake mechanism 220 is brought into the operated state.

Figure 20A:
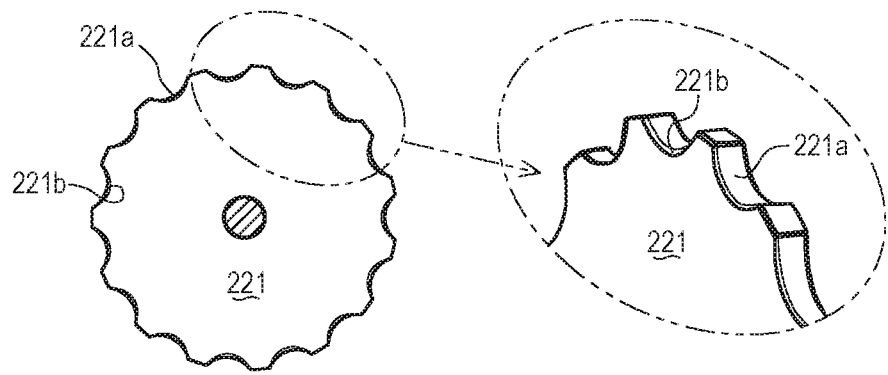
Figure 20B:
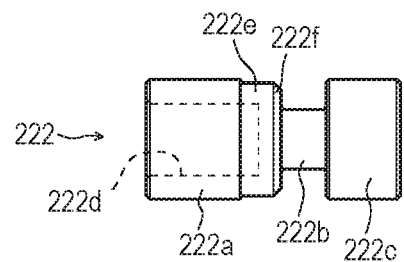
Figure 20C:
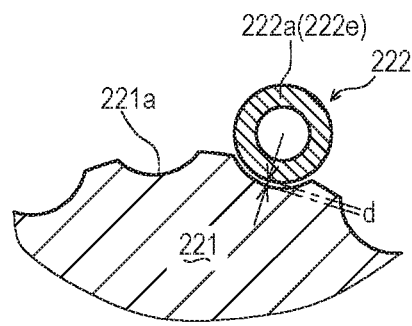

The parking brake device 2 has such a configuration that when energization to the solenoid valve 232 is stopped during high speed running, the locking member 222 is not engaged in the recess 221a of the brake rotor 221. More specifically, the transaxle has at least one of the following configurations a) to c): a) a chamfered portion 221b is provided around an outer peripheral edge of the recess 221a (see FIG. 20A); b) a chamfered portion 222f is provided around the locking member 222 (see FIG. 20B); and c) a gap d between the recess 221a and the locking portion 222a (more specifically, diameter-reduced portion 222e) of the locking member 222 is reduced in size as small as possible (see FIG. 20C). The transaxle may have a combination of the configurations a) to c), or may have all of the configurations a) to c). If an angle of the chamfered portions 221b and 222d or a size of the gap d is appropriately selected, it is possible to flip the locking member 222 when the brake rotor 221 rotates at not less than the predetermined number of rotations, and to prevent the locking member 222 from being shifted to the first position X.

If the transaxle has such configurations, when the locking member 222 tries to be displaced to the lock position, the locking member 222 is flipped by the brake rotor 221 under high speed rotation and the locking member 222 cannot be engaged in the recess 221*a*. According to this, when the working vehicle 1 runs at high speed for example, even if energization to the solenoid valve 232 is stopped, the parking brake mechanism 220 is not operated suddenly, and it is possible to prevent the working vehicle 1 from stopping abruptly.

What is claimed is:

1. A hydraulic transaxle comprising:
 a housing which supports an axle and in which oil is stored;
 a hydraulic continuously variable transmission for driving the axle disposed in the housing that uses the oil as hydraulic oil;
 an oil-supply mechanism which draws the oil and which includes an external oil-supply circuit that transfers the oil from the housing to the exterior of the housing;
 a hydraulic speed control mechanism for adjusting output of the hydraulic continuously variable transmission;
 a parking brake mechanism configured to restrict rotation of the axle, comprising:
  a brake rotor capable of rotating in association with the axle, and
  a locking member being displaceable between a first position where the brake rotor is locked and cannot rotate and a second position where the brake rotor is unlocked and is free to rotate;
 the hydraulic transaxle further comprising:
  a hydraulic brake mechanism capable of displacing the locking member to the second position by hydraulic pressure of the oil, wherein the hydraulic speed control mechanism and the hydraulic brake mechanism are connected to the external oil-supply circuit in parallel; and
  an on-off valve configured to control supply of the oil from the external oil-supply circuit is provided at a location of the external oil-supply circuit closer to the oil-supply mechanism than a connecting point of the hydraulic speed control mechanism and the external oil-supply circuit, and a connecting point of the hydraulic brake mechanism and the external oil-supply circuit.

2. A work vehicle, comprising:
 a left transaxle according to the hydraulic transaxle of claim 1 disposed in the vehicle;
 a right transaxle according to the hydraulic transaxle of claim 1 disposed in the vehicle;
 the left and right transaxles further comprising:
  oil output ports for taking the oil from charge pumps to the exterior of the housings, wherein the oil output ports are disposed on the housings of the left transaxle and the right transaxle; and
  oil input ports which are in communication with replenishing systems of the oil to the hydraulic continuously variable transmissions disposed on outer surfaces of the left and right housings,
  wherein the oil-supply mechanisms of the left and right transaxles are the charge pumps respectively provided in the hydraulic continuously variable transmissions of the left and right transaxles,
  wherein the left and right transaxles comprise a pair of oil passages for connecting the oil output port of any one of the housings and the oil input port of the other housing, and
  wherein any one of the pair of oil passages comprises the external oil-supply circuit.

3. The hydraulic transaxle according to claim 1, wherein the hydraulic brake mechanism further comprising a spring member for biasing the locking member to the first position constantly.

4. A hydraulic transaxle comprising:
 a housing which supports an axle and in which oil is stored;
 a hydraulic continuously variable transmission for driving the axle disposed in the housing that uses the oil as hydraulic oil;
 a parking brake unit configured to restrict rotation of the axle, comprising:
  a brake rotor which is provided on a rotation shaft constituting a transmitting mechanism and which can coaxially rotate with the rotation shaft;
  a locking member being displaceable between a first position where the brake rotor is locked and cannot rotate and a second position where the brake rotor is unlocked and is free to rotate, and
 the locking member comprising:
  a locking portion that is engaged in a recess formed in the brake rotor and which locks the brake rotor in the first position; and
  a non-locking portion which is placed in a position corresponding to the recess and which separates from the brake rotor in the second position,
 wherein the hydraulic transaxle comprises an oil-supply mechanism capable of displacing the locking member to the second position by hydraulic pressure.

5. The hydraulic transaxle according to claim 4, wherein the parking brake unit further includes a pushing part capable of mechanically pushing the locking member from the first position, and
 wherein the locking member can be displaced from the first position to the second position against a biasing force of the spring member by the pushing part.

6. The hydraulic transaxle according to claim 4, wherein a displacing direction of the locking member is parallel to a direction of the rotation shaft of the brake rotor, and
 the recess of the brake rotor is formed such that the locking member can be engaged in the recess along a direction that is parallel to the direction of the rotation shaft of the brake rotor.

7. A work vehicle, comprising:
 a left transaxle according to the hydraulic transaxle of claim 4 disposed in the vehicle;
 a right transaxle according to the hydraulic transaxle of claim 4 disposed in the vehicle;
 the left and right transaxles further comprising:
  oil output ports for taking supply systems of hydraulic oil from charge pumps to the exterior of the housings; and
  oil input ports which are in communication with replenishing systems of the hydraulic oil to the hydraulic continuously variable transmissions disposed on outer surfaces of the left and right housings;
 wherein the oil-supply mechanisms of the left and right transaxles are the charge pumps respectively provided in the hydraulic continuously variable transmissions of the left and right transaxles, wherein the left and right transaxles comprise a pair of oil passages for connecting the oil output port of any one of the housings and the oil input port of the other housing, and wherein the left and right transaxles further comprise valves configured to control supply of the hydraulic oil to the locking members of the left and right transaxles, and to control discharge of the hydraulic oil supplied from the locking members, wherein the valves are fluidly connected to one of the pair of oil passages.

8. The hydraulic transaxle according to claim 4, wherein the parking brake unit further comprising a spring member for biasing the locking member to the first position constantly.

9. The hydraulic transaxle according to claim 4, wherein a chamfered portion is provided around an outer peripheral edge of the recess of the brake rotor.

10. The hydraulic transaxle according to claim 4, wherein a chamfered portion is provided around an outer peripheral edge of an end surface of the locking portion of the locking member on a side of the non-locking portion.

* * * * *